US012811385B2

(12) United States Patent
Chia et al.

(10) Patent No.: US 12,811,385 B2
(45) Date of Patent: Nov. 24, 2026

(54) SYSTEM AND METHODS FOR DETECTING AND IDENTIFYING ARCING BASED ON DISCRETE TIME SIGNAL PROCESSING

(71) Applicant: Hubbell Incorporated, Shelton, CT (US)

(72) Inventors: Brian Chia, Cheshire, CT (US); James Casey Musson, Derby, CT (US); Ricky He, Bridgeport, CT (US)

(73) Assignee: Hubbell Incorporated, Shelton, CT (US)

( * ) Notice: Subject to any disclaimer, the term of this patent is extended or adjusted under 35 U.S.C. 154(b) by 213 days.

(21) Appl. No.: 18/911,085

(22) Filed: Oct. 9, 2024

(65) Prior Publication Data

US 2025/0125606 A1 Apr. 17, 2025

Related U.S. Application Data

(60) Provisional application No. 63/589,478, filed on Oct. 11, 2023.

(51) Int. Cl.
*H02H 1/00* (2006.01)
*H02H 3/16* (2006.01)

(52) U.S. Cl.
CPC ........ *H02H 1/0015* (2013.01); *H02H 1/0092* (2013.01); *H02H 3/16* (2013.01)

(58) Field of Classification Search
CPC ....... H02H 1/0015; H02H 1/0092; H02H 3/16
See application file for complete search history.

(56) References Cited

U.S. PATENT DOCUMENTS

| | | | | |
|---|---|---|---|---|
| 2007/0057678 A1 | 3/2007 | DVorak et al. | | |
| 2009/0171603 A1* | 7/2009 | Changali | H02H 1/0015 | 702/66 |
| 2010/0157488 A1* | 6/2010 | Hall | H02H 1/0015 | 361/42 |
| 2010/0165521 A1* | 7/2010 | Changali | H02H 1/0015 | 361/42 |
| 2018/0151311 A1 | 5/2018 | Aromin et al. | | |

(Continued)

OTHER PUBLICATIONS

PCT/US2024/050591 International Search Report and Written Opinion dated Nov. 18, 2024 (18 pages).

*Primary Examiner* — Gary L Laxton
(74) *Attorney, Agent, or Firm* — Michael Best & Friedrich LLP

(57) ABSTRACT

A circuit interrupting device including a line terminal, a current sensor to measure a current flowing through the line terminal, a zero cross detection circuit to measure a voltage and a frequency of the line terminal, and a microcontroller. The microcontroller configured to apply a digital filter to a line current measurement signal, determine zero cross positions of a line voltage measurement signal, count a plurality of turning points of the filtered line current measurement signal, determine a position of each of the plurality of turning points relative to a corresponding zero cross position, determine a time between each turning point and subsequent turning point, and determine whether an arc fault is present within the circuit interrupting device based on the plurality of turning points, the position of each turning point relative to the corresponding zero cross position, and the time between each turning point and the subsequent turning point.

20 Claims, 20 Drawing Sheets

(56) References Cited

U.S. PATENT DOCUMENTS

| | | | | |
|---|---|---|---|---|
| 2019/0219630 | A1 | 7/2019 | Parker et al. | |
| 2022/0337049 | A1 | 10/2022 | Brower et al. | |
| 2023/0053431 | A1* | 2/2023 | Zhang .................. | H02H 1/0015 |
| 2023/0307900 | A1 | 9/2023 | Brower et al. | |
| 2024/0120725 | A1* | 4/2024 | Hurwitz ................. | G01R 31/52 |

* cited by examiner

SYSTEM AND METHODS FOR DETECTING AND IDENTIFYING ARCING BASED ON DISCRETE TIME SIGNAL PROCESSING

RELATED APPLICATION

This application claims the benefit of U.S. Provisional Patent Application No. 63/589,478, filed Oct. 11, 2023, the entire content of which is hereby incorporated by reference.

FIELD

The present disclosure relates generally to switched electrical devices. More particularly, the present disclosure is directed to circuit interrupting devices, such as arc fault circuit interrupter (AFCI) devices and/or ground fault circuit interrupter (GFCI) devices, that change to a “tripped” or unlatched state from a “reset” or latched state when one or more conditions are detected.

SUMMARY

Switched electrical devices are installed in electrical panels and receptacles to disconnect electrical circuits in response to potentially damaging arc and fault conditions. When an arc condition or a fault condition occurs, switched electrical devices act as a circuit breaker to disconnect an electrical connection within the electrical circuit to prevent damage to components of the electrical circuit and potential harm to a user. In some instances, switched electrical devices may provide a false detection of an arc condition or a fault condition and disconnect power through the electrical circuit when arcing or a fault is not present. As a result, when the electrical circuit experiences electrical loads which exhibit features similar to arc or fault conditions such as a combination of different electrical loads, an inrush behavior of electrical loads, and switching of electrical loads on and off, it may be difficult for the switched electrical device to determine whether arc and fault conditions are present in the electrical circuit. Thus, a solution that increases the reliability and accuracy of switched electrical devices when detecting arc and fault conditions is desired.

One aspect of the present disclosure provides a circuit interrupting device including a line terminal, a current sensor configured to measure a current flowing through the line terminal, a zero cross detection circuit configured to measure a voltage and a frequency of the line terminal, and a microcontroller including an electronic processor. The microcontroller is configured to apply a digital filter to a line current measurement signal received from the current sensor and determine a plurality of zero cross positions of a line voltage measurement signal received from the zero cross detection circuit. The microcontroller is further configured to count a plurality of turning points of the filtered line current measurement signal, determine a position of each turning point of the plurality of turning points relative to a corresponding zero cross position of the plurality of zero cross positions, determine a time between each turning point of the plurality of turning points and the subsequent turning point of the plurality of turning points, and determine a local extreme derivative value around each turning point. The microcontroller is further configured to determine whether an arc fault is present within the circuit interrupting device based on the plurality of turning points, the position of each turning point relative to the corresponding zero cross position, the time between each turning point and the subsequent turning point, and the local extreme derivative value around each turning point.

Another aspect of the present disclosure provides a method of detecting presence of an arc fault occurring within a circuit including a line terminal. The method includes applying, via a microcontroller including an electronic processor, a digital filter to a line current measurement signal received from a current sensor configured to measure a current flowing through the line terminal and determining, via the microcontroller, a plurality of zero cross positions of a line voltage measurement signal received from a zero cross detection circuit configured to measure a voltage and a frequency of the line terminal. The method further includes counting, via the microcontroller, a plurality of turning points of the filtered line current measurement signal, determining, via the microcontroller, a position of each turning point of the plurality of turning points relative to a corresponding zero cross position of the plurality of zero cross positions, determining, via the microcontroller, a time between each turning point of the plurality of turning points and the subsequent turning point of the plurality of turning points, and determining a local extreme derivative value around each turning point. The method further includes determining, via the microcontroller, whether an arc fault is present within the circuit interrupting device based on the plurality of turning points, the position of each turning point relative to the corresponding zero cross position, the time between each turning point and the subsequent turning point, and the local extreme derivative value around each turning point.

Another aspect of the present disclosure provides a system including a circuit interrupting device. The circuit interrupting device includes a line terminal, a current sensor configured to measure a current flowing through the line terminal, a zero cross detection circuit configured to measure a voltage and a frequency of the line terminal, and a microcontroller including an electronic processor. The microcontroller is configured to receive a line current measurement signal from the current sensor, receive a line voltage measurement signal from the zero cross detection circuit, apply a digital filter to the line current measurement signal, and determine a plurality of zero cross positions of the line voltage measurement signal. The microcontroller is further configured to count a plurality of turning points of the filtered line current measurement signal, determine a position of each turning point of the plurality of turning points relative to a corresponding zero cross position of the plurality of zero cross positions, determine a time between each turning point of the plurality of turning points and the subsequent turning point of the plurality of turning points, and determine a local extreme derivative value around each turning point. The microcontroller is further configured to determine whether an arc fault is present within the circuit interrupting device based on the plurality of turning points, the position of each turning point relative to the corresponding zero cross position, the time between each turning point and the subsequent turning point, and the local extreme derivative value around each turning point.

Other aspects of the disclosure will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1A:
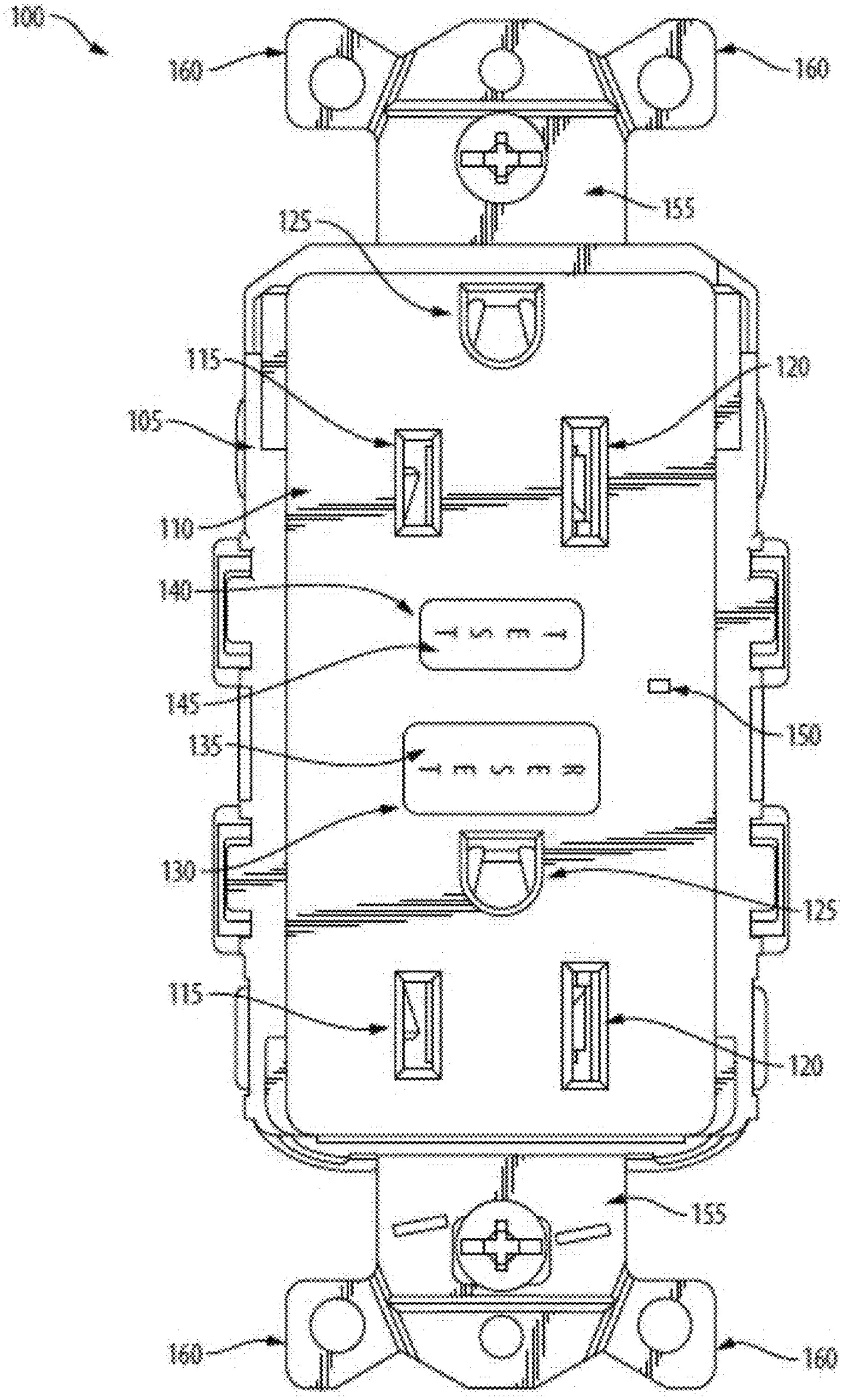
FIG. 1A illustrates a perspective view of an AFCI device, or AFCI receptacle, according to some embodiments.

FIG. 1A illustrates a front view of an AFCI device, or AFCI receptacle, 100 according to some embodiments of the present disclosure. Although some of the embodiments described herein are implemented with respect to the AFCI receptacle 100, it should be understood that, in some instances, the embodiments described herein may be implemented with respect to a GFCI receptacle to detect a ground fault, or with respect to another suitable switched electrical device. As illustrated, in some embodiments, the AFCI receptacle 100 includes a front cover 105 having a duplex outlet face 110 with a phase, or hot, opening 115, a neutral opening 120, and a ground opening 125. The face 110 may further have opening 130, accommodating a RESET button 135, an adjacent opening 140, accommodating a TEST button 145, and one or more additional openings 150. In some embodiments, the one or more additional openings 150 accommodate indicators, such as but not limited to, various colored light-emitting diodes (LEDs). In some embodiments, the one or more additional openings 150 accommodate bright LEDs used, for example, as a nightlight. In some embodiments, the one or more additional openings 150 accommodate a photoconductive photocell used, for example, to control the nightlight LEDs. In some embodiments, the one or more additional openings 150 provide access to a set screw for adjusting a photocell device or a buzzer in accordance with this, as well as other, embodiments. The AFCI receptacle 100 may also include a rear cover (not shown or enumerated) that is secured to the front cover 105 by a plurality of fasteners (not shown or enumerated) and a ground yoke/bridge assembly 155. In some embodiments, the ground yoke/bridge assembly 155 includes standard mounting ears 160 that protrude from ends of the receptacle 100.

Figure 1B:
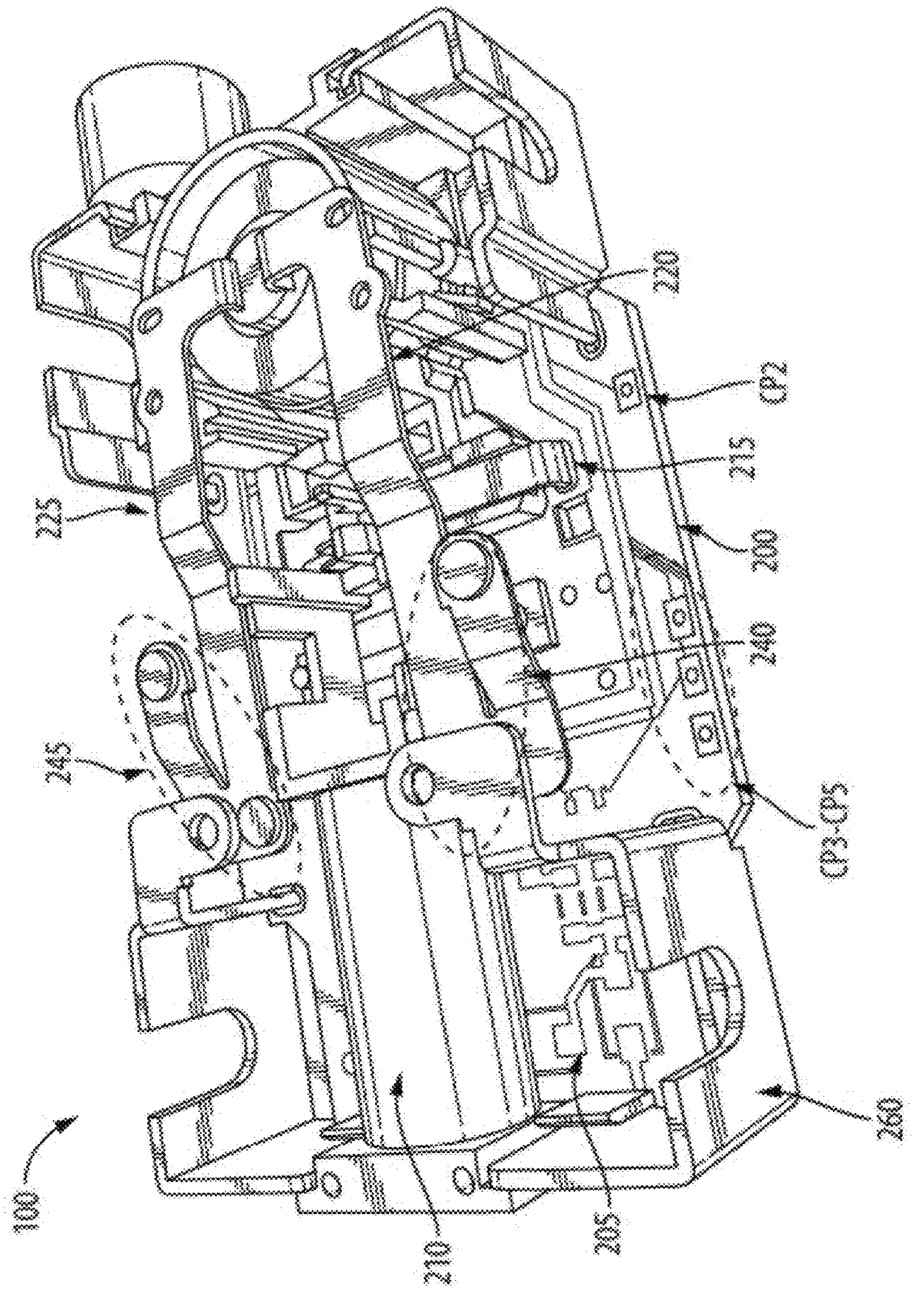
FIG. 1B illustrates a perspective view of the AFCI receptacle of FIG. 1A with a front cover removed to expose a primary printed circuit board (PCB), according to some embodiments.
Figure 2:
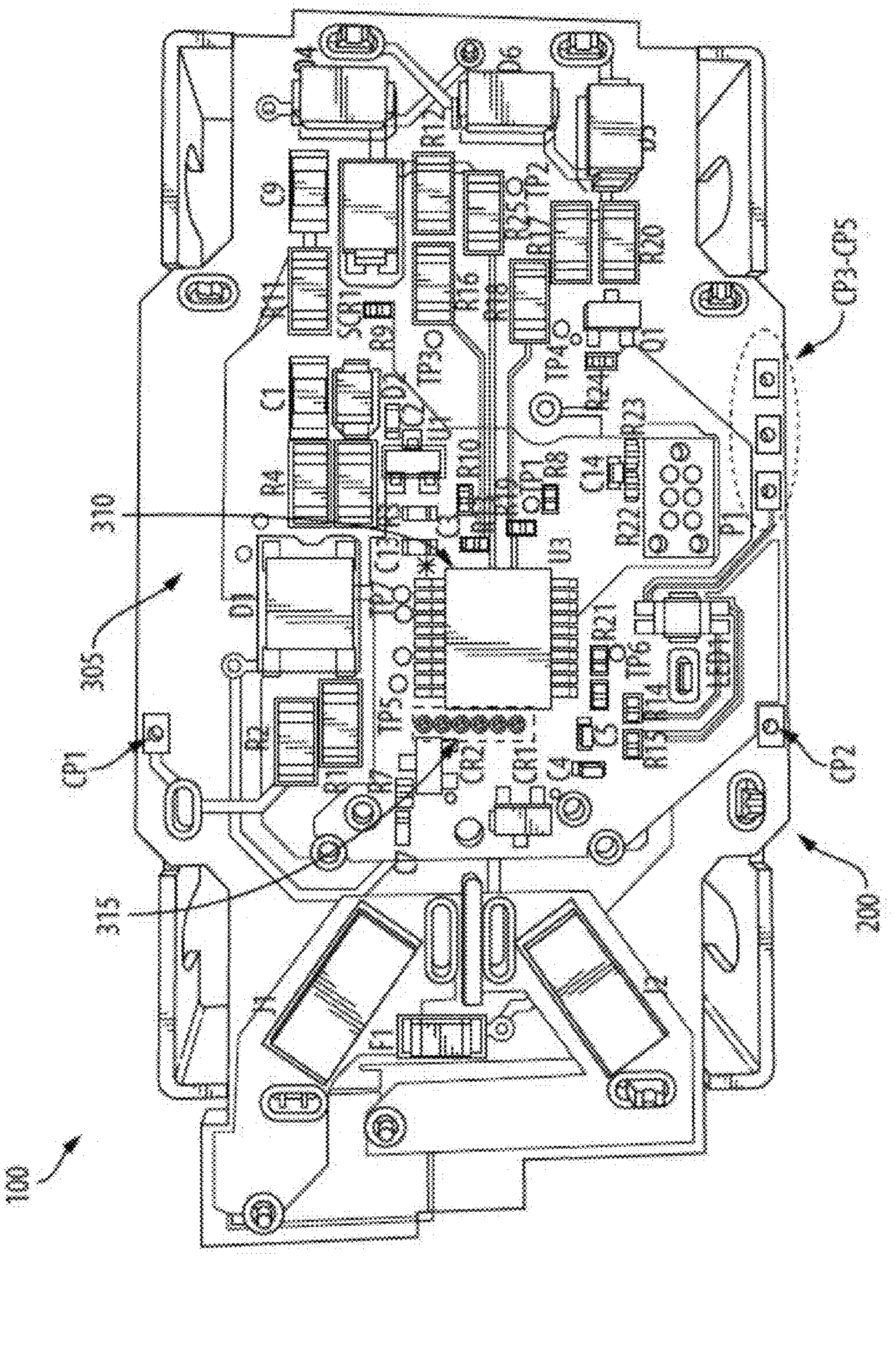
FIG. 2 illustrates a perspective view of the primary PCB of FIG. 1B, according to some embodiments.
Figure 3:
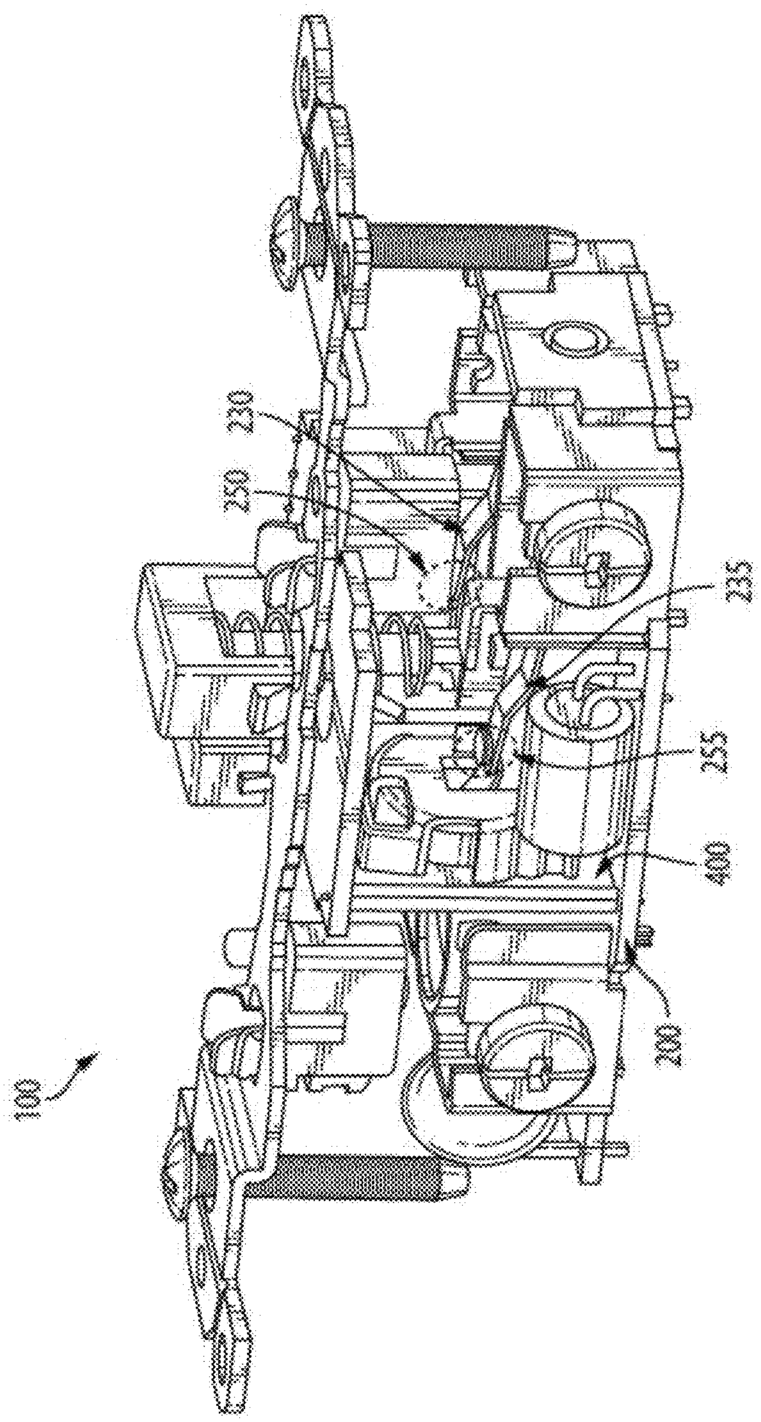
FIG. 3 illustrates a perspective view of the AFCI receptacle of FIG. 1A with a front cover removed to expose a secondary PCB, according to some embodiments.

FIGS. 1B-3 illustrate perspective views of the AFCI receptacle 100 in which the front cover 105, rear cover, and other components have been removed to expose a primary printed circuit board (PCB), or primary board, 200 according to some embodiments. In some embodiments, the primary board 200 provides control and physical support for most of the working components included in the AFCI receptacle 100. For example, as shown in FIG. 1B, a top surface 205 of the primary board 200 provides support for a solenoid or, interrupting device, 210. The top surface 205 further supports cantilevered phase and neutral line contact arms 220, 225 and phase and neutral load contact arms 230, 235 (FIG. 3). The respective distal ends of the line contact arms 220, 225 support the phase and neutral line contacts 240, 245. Likewise, the respective distal ends of the load contact arms 230, 235 support the phase and neutral load contacts 250, 255 (FIG. 3). The resiliency of the cantilevered line contact arms 220, 225 biases the line contacts 240, 245 away, or separated, from the load contacts 250, 255. The load contact arms 230, 235 extend from a movable contact carriage 260, which is constructed from an insulating material.

As shown in the embodiment of FIG. 2, the primary board 200 further includes a bottom surface 305 that provides physical and operational support for many of the control electronics included in the AFCI receptacle 100. For example, the bottom surface 305 supports a controller 310 and one or more slots, or interfaces, 315 for receiving connection. The controller 310 may be an integrated circuit device, such as a Microchip microcontroller. However, in other embodiments, the controller 310 is implemented as another type of processor-based control device. The controller 310, which includes a memory and an electronic processor, may be configured to control various operations of the AFCI receptacle 100. For example, in some embodiments, the controller 310 is configured to detect the occurrence of an arc fault. In some embodiments, primary board 200 includes additional communication interfaces CP1-CP5, which may also be referred to as compliant pins.

Figure 4:
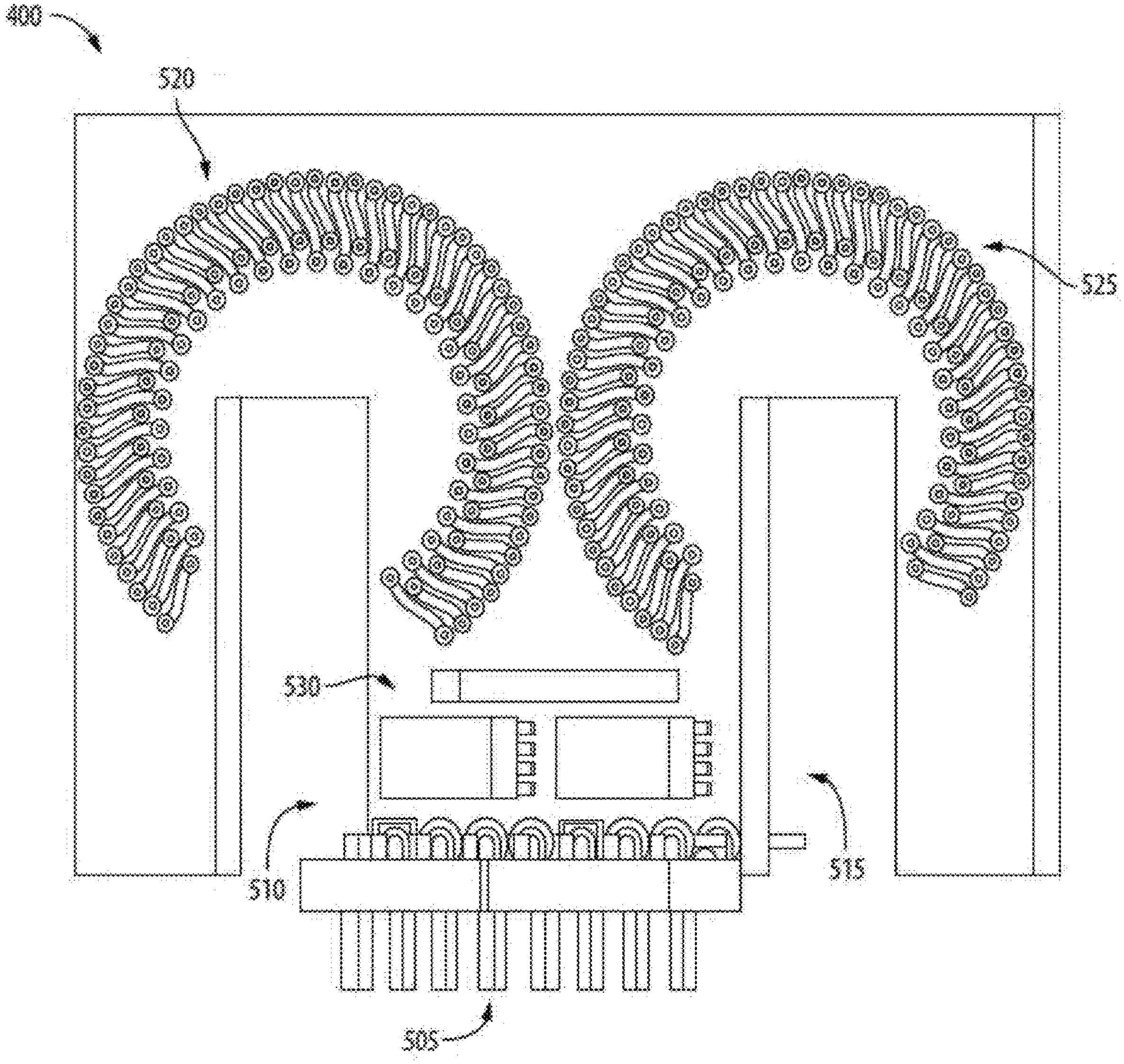
FIG. 4 illustrates a perspective view of the second PCB of FIG. 3, according to some embodiments of the application.

In some embodiments, the AFCI receptacle 100 includes one or more additional PCBs that provide physical and operational support for one or more additional control electronics included in the AFCI receptacle 100. For example, as shown in FIGS. 3 and 4, the AFCI receptacle 100 may include a second PCB, or secondary board, 400 that is used to detect the occurrence of an arc fault. The secondary board 400 may be connected to the primary board 200, for example, by one or more pins 505. In some embodiments, the pins 505 include one or more serial communication pins used for transferring data signals between the primary and secondary boards 200, 400. For example, the pins 505 may include one or more serial-peripheral interface (SPI) pins configured for linking communication between the primary board 200 and the second board 400. In some embodiments, the pins 505 further include one or more power pins used for transferring power between the primary and secondary boards 200, 400. In some embodiments, pins 505 are received by interfaces 315 of the primary board 200. In some embodiments, pins 505 are connected to interfaces CP1-CP5 of the primary board 200. In addition, first and second apertures 510, 515 are formed in the secondary board 400 and are respectively arranged to receive the line contact arms 220, 225. In some embodiments, the first aperture 510 is configured to receive the phase line contact arm 220, while the second aperture 515 is configured to receive the neutral line contact arm 225.

As shown in FIG. 4, the secondary board 400 may be implemented as an AFCI module that includes one or more circuit components used for detecting the presence of an arc fault within the AFCI receptacle 100 and/or the circuit to which the AFCI receptacle 100 is connected. In such embodiments, as shown in FIG. 4, the secondary board 400 includes one or more current sensors, such as first and second coils 520, 525. In some embodiments, the first and second coils 520, 525 are embedded in the secondary board 400 and respectively include first and second coil apertures 510, 515. In some embodiments, the first coil aperture is configured to receive the phase line contact arm 220, whereas the second coil aperture is configured to receive the neutral line contact arm 225. In some embodiments, the first and second coils 520, 525 are implemented as Rogowski coils. In some embodiments, the first and second coils 520, 525 are implemented as other types of sensors such as, but not limited to, shunt resistors, current transformers, etc.

In some embodiments, the secondary board 400 further includes an arc fault detection circuit 530, which includes one or more electrical components used to detect the occurrence of an arc fault. For example, the arc fault detection circuit 530 may include a bandpass filter, an analog-to-digital converter (ADC), an integrator, a gain stage, or scaling module, a resonator and/or a time-domain correlator. In some embodiments, the secondary board 400 does not include its own controller. In such embodiments, the controller 310 is configured to determine whether an arc fault is present based on data received from the arc fault detection circuit 530. In some embodiments, the arc fault detection circuit 530 includes its own controller that is configured to control operation of the components included in arc fault detection circuit 530. In such embodiments, the arc fault detection circuit 530 is configured to perform a plurality of functions related to detecting the occurrence of an arc fault. The controller included in arc fault detection circuit 530 may be implemented as the same type of controller as controller 310. However, in some embodiments, controller included in detection circuit 530 is implemented as some other type of microcontroller.

In some embodiments, the AFCI receptacle 100 does not include a secondary board 400. In such embodiments, the first and second coils 520, 525 and the arc fault detection circuit 530 are supported by the primary board 200. Accordingly, in such embodiments, the controller 310 is configured to determine whether an arc fault is present.

Figure 5A:
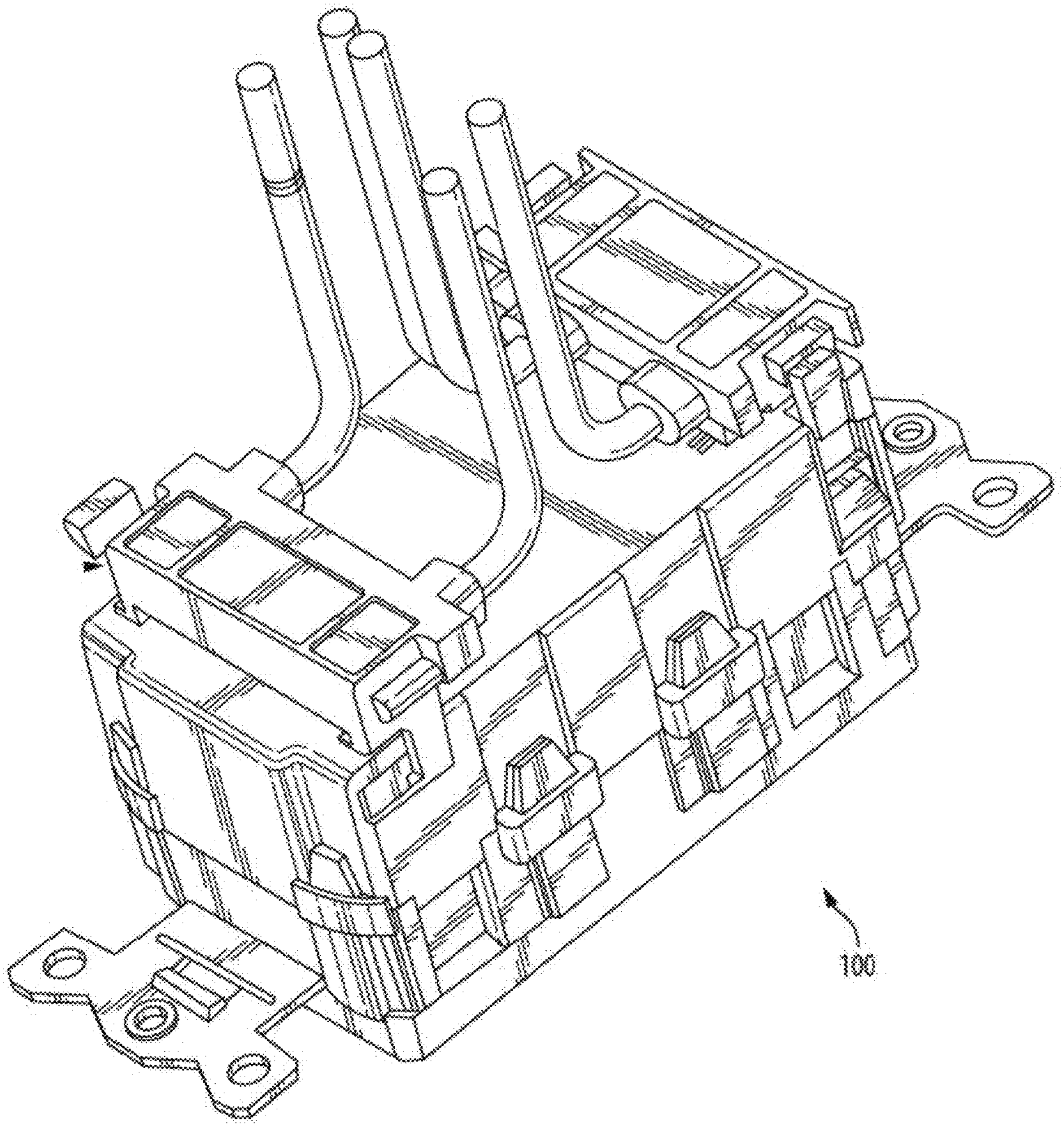
FIGS. 5A and 5B illustrate perspective views of an AFCI receptacle, according to some embodiments.
Figure 5B:
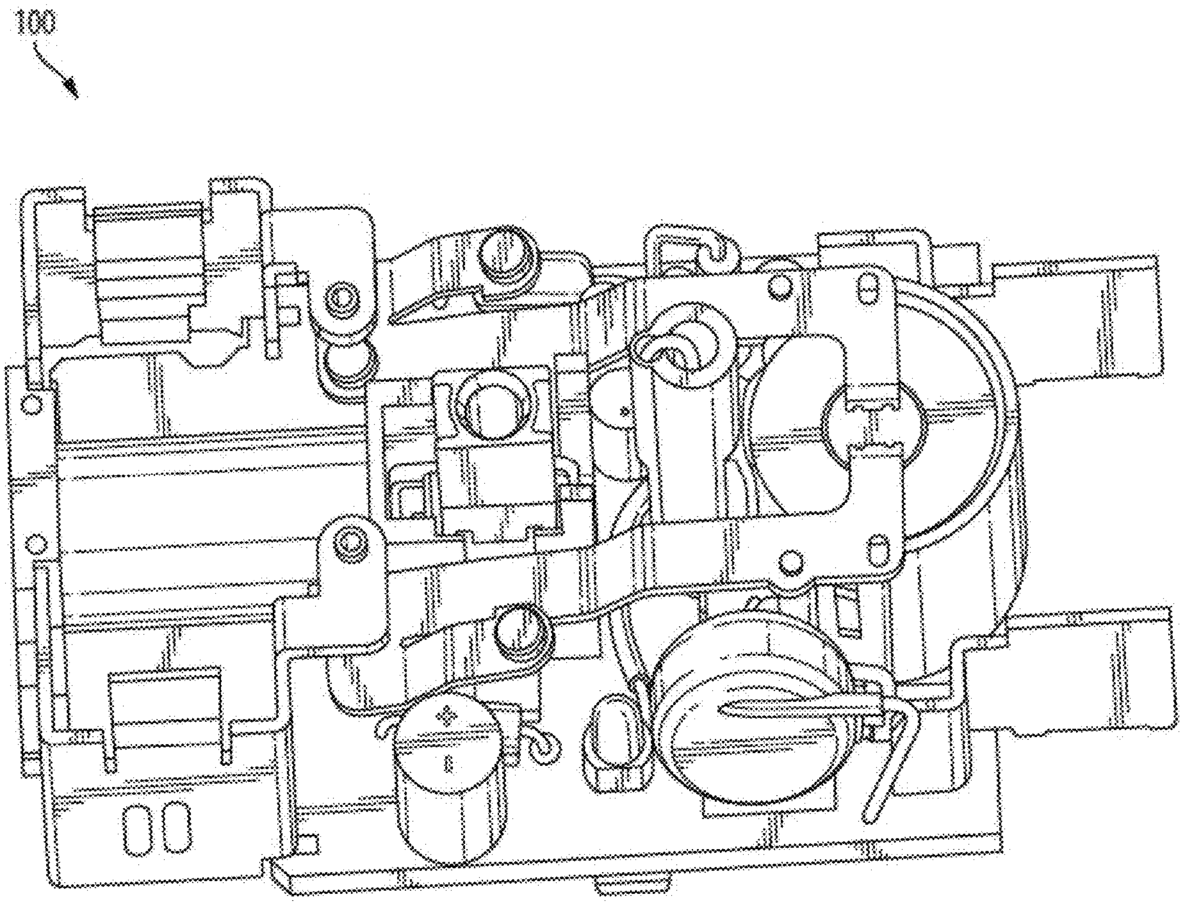

Although illustrated in FIG. 3 as including terminal screws configured for receiving power from an external power source and/or providing power to additional downstream devices, in some embodiments, the AFCI receptacle 100 includes different terminal connection components configured to receive power from the external power source and/or provide power to downstream devices. For example, FIGS. 5A-5B illustrate an embodiment of the AFCI receptacle 100 that includes line and load terminal connectors that are coupled to the AFCI receptacle 100 by a snap fit connection, such as the receptacles described in U.S. Patent Application Publication No. 2021/0226389, published Jul. 22, 2021 and entitled "GROUND FAULT CIRCUIT INTERRUPTERS AND CONNECTORS FOR USE WITH THE SAME," the entire content of which is hereby incorporated by reference. It should be understood that, in some embodiments, the AFCI receptacle 100 is implemented as a receptacle type that is not explicitly described herein.

Figure 6:
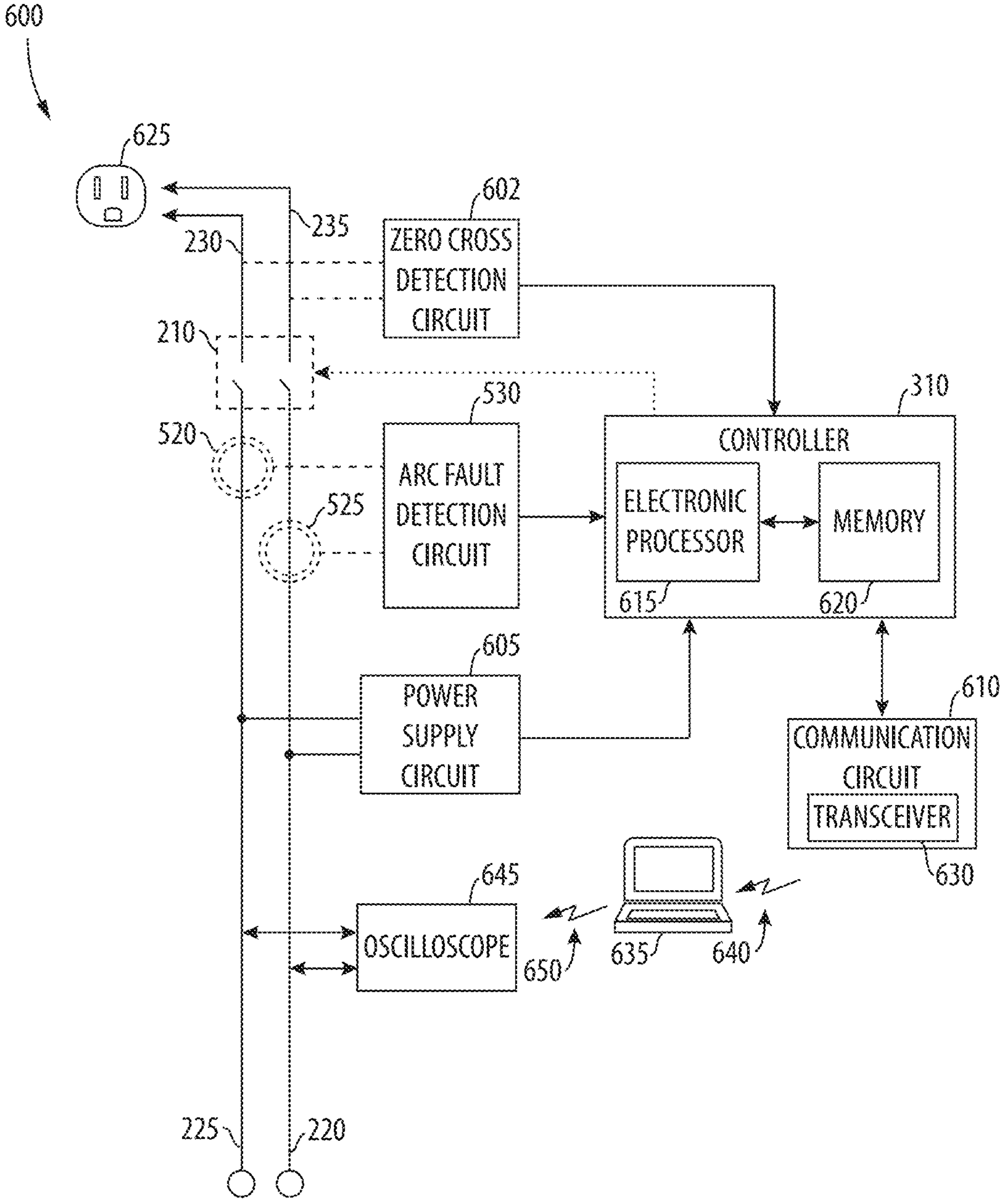
FIG. 6 illustrates a block diagram of a control system of the AFCI receptacle of FIG. 1A, according to some embodiments.

FIG. 6 is a block diagram illustrating a control system, or circuit, 600 of the AFCI receptacle 100, according to some embodiments. In the illustrated embodiment, the control system 600 includes the controller 310 supported by primary board 200. However, it should be understood that, in some embodiments, the control system 600 is implemented with a controller supported by the secondary board 400. That is, in embodiments in which the secondary board 400 includes its own controller, the controller supported by the secondary board 400 may be configured to perform the processes described herein with respect to the controller 310. Similarly, the control system 600 of the illustrated embodiment includes first and second coils 520, 525 and the arc fault detection circuit 530, which are supported by secondary board 400. However, it should be understood that in embodiments in which the AFCI receptacle 100 does not include a secondary board 400, the first and second coils 520, 525 and arc fault detection circuit 530 are supported by the primary board 200.

As shown in FIG. 6, the controller 310 is electrically and/or communicatively connected to a variety of modules or components of the AFCI receptacle 100. For example, the controller 310 is connected to the interrupting device 210, the first and second coils 520, 525, the arc fault detection circuit 530, a zero cross detection circuit 602, a power supply circuit 605, and a communication circuit 610.

In some embodiments, the controller 310 includes a plurality of electrical and electronic components that provide power, operational control, and protection to the components and modules within the controller 310 and/or the AFCI receptacle 100. For example, the controller 310 includes, among other things, an electronic processor 615 (for example, a microprocessor or another suitable programmable device) and a memory 620. In some embodiments, the controller 310 further includes the arc fault detection circuit 530 and the zero cross detection circuit 602. That is, in some embodiments, the arc fault detection circuit 530 and the zero cross detection circuit 602 are integrated within the controller 310.

The memory 620 includes, for example, a program storage area and a data storage area. The program storage area and the data storage area can include combinations of different types of memory, such as read-only memory (ROM) and/or random-access memory (RAM). Various non-transitory computer readable media, for example, magnetic, optical, physical, or electronic memory may be used. The electronic processor 615 is communicatively coupled to the memory 620 and executes software instructions that are stored in the memory 620, or stored on another non-transitory computer readable medium such as another memory or a disc. Instructions may include instructions, which when executed by processor 615, cause the control system 600 to implement any of a variety of arc fault detection actions as described herein. The software may include one or more applications, program data, filters, rules, one or more program modules, and other executable instructions.

In some embodiments, the memory 620 stores a machine learning model that is to be implemented by the electronic processor 615. In some embodiments, the machine learning model is executed by the electronic processor 615 to cause the control system 600 to detect an arc fault within AFCI receptacle 100 and/or the circuit to which the AFCI receptacle 100 is connected. More particularly, the machine learning model may be executed by electronic processor 615 to cause the controller 310 and/or arc detection circuit 530 to detect an arc fault within AFCI receptacle 100 and/or the circuit to which the AFCI receptacle 100 is connected. The machine learning model may be implemented as, for example, a neural network, a fuzzy logic model, convolutional network, and/or other such model trained to detect arc faults as detailed herein.

The phase and neutral line contact arms, or terminals, 220, 225 are configured to receive a line power from source. The first and second coils 520, 525 are arranged to monitor current flowing through the phase and neutral line terminals 220, 225 respectively. As described above, the phase and neutral line terminals support contacts 240, 245 are selectively connected, via interrupting device 210, to the load contacts 250, 255 supported by phase and neutral load terminals 230, 235. The phase and neutral load terminals 230, 235 are configured to power an external load connected to an outlet 625 of AFCI receptacle 100. The zero cross detection circuit 602 is configured to measure the line voltage and frequency of the line terminals 220, 225 and/or the load terminals 230, 235.

In some embodiments, the first and second coils 520, 525 are arranged to monitor current flowing through the phase and neutral load terminals 230, 235. In some embodiments, the first and second coils 520, 525 are arranged to monitor current flowing through the phase and neutral line terminals respectively, and third and fourth coils (not shown) are arranged to monitor current flowing through the phase and neutral load terminals 230, 235, respectively. Current measurements taken by the first and second coils 520, 525 are provided to the arc fault detection circuit 530 and/or controller 310. In some embodiments, the arc fault detection circuit 530 further includes the zero cross detection circuit 602. That is, in some embodiments, the zero cross detection circuit 602 is integrated within the arc fault detection circuit 530.

The power supply circuit 605 is configured to convert line power to a nominal power for use by the controller 310. For example, the power supply circuit 605 may include a rectifier that is configured to rectify the line power to a nominal power for powering the controller 310. In some embodiments, the power supply circuit 605 rectifies alternating current (AC) power to a nominal direct current (DC) power. In some embodiments, the power supply circuit 605 includes one or more additional conversion circuits for converting line power to one or more additional power levels for use by control system 600.

The communication circuit 610 is configured to provide communication between the AFCI receptacle 100 and one or more external devices (for example, other receptacles, electrical devices, external computers, smart phones, tablets, etc.). For example, the communication circuit 610 is configured to provide communication between the AFCI receptacle 100 and an external device 635. In the illustrated embodiment, the external device 635 is shown as a laptop that includes an electronic processor and a memory. However, it should be understood that the external device 635 may be implemented as one or more of the above noted examples.

In such embodiments, the AFCI receptacle 100 communicates with the one or more external devices through a network using, for example, a transceiver 630. The network is, for example, a wide area network (WAN) (e.g., the Internet, a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network includes one or more of a wide area network (WAN), a local area network (LAN), a neighborhood area network (NAN), a home area network (HAN), or personal area network (PAN). In some embodiments, the communication circuit 610 communicates with the external device 635 using a wired connection.

In some embodiments, the transceiver 630 is configured to enable wireless communication between the AFCI receptacle 100 and an external device 635 using a wireless communication link 640. In other embodiments, rather than the transceiver 630, the AFCI receptacle 100 includes separate transmitting and receiving components, for example, a transmitter and a receiver. In operation, the controller 310 is configured to control the communication circuit 610 to transmit and receive data to and from the AFCI receptacle 100.

In some embodiments, the control system 600 further includes an oscilloscope 645. The oscilloscope 645 is configured to measure current, voltage, frequency, and/or other electrical characteristics of the AFCI receptacle 100. In the illustrated embodiment, the oscilloscope 645 is shown as measuring the line-side current and voltage; however, it should be understood that the oscilloscope 645 may also be configured to measure load-side characteristics of the AFCI receptacle 100. As shown, the oscilloscope 645 is configured to provide the current and voltage measurements to external device 635 via a communication link 650, which may be implemented as a wireless or wired connection.

During operation of the AFCI receptacle 100, the control system 600 may be in a standby mode or an operation mode. When in the standby mode, the interrupting device 210 electrically disconnects the line terminals 220, 225 from the load terminals 230, 235. Accordingly, in the standby mode, power is not provided to the outlet 625. When in the operation mode, the interrupting device 210 electrically connects the line terminals 220, 225 to the load terminals 230, 235. Accordingly, in the operation mode, power is provided to the outlet 625 and, thus, to an external load electrically connected to the outlet 625.

While power is provided to the outlet 625, the control system 600 is configured to monitor for the occurrence of an arc fault within the AFCI receptacle 100 and/or the circuit to which AFCI receptacle 100 is connected. In particular, the arc fault detection circuit 530 and/or the controller 310 are configured to perform one or more arc fault detection processing techniques to determine whether an arc fault is present. For example, when determining whether an arc fault is present, the arc fault detection circuit 530 and/or controller 310 may be configured to extract and analyze measurements indicative of volatility, power, and/or frequency content of an external load from the load terminals 230, 235. Furthermore, as another example, the arc fault detection circuit 530 and/or controller 310 are configured to employ statistical and spectral analysis to analyze line and/or load current measurements recorded by the first and second coils 520, 525. The arc fault detection circuit 530 and/or controller 310 analyzes the line and load terminal currents, voltages, and/or frequencies in the digital domain to reduce noise. As described below, the controller 310 may be further configured to determine whether an arcing fault is present by applying the analysis of the line and/or load electrical characteristics to a deep learning/machine learning model.

Figure 7:
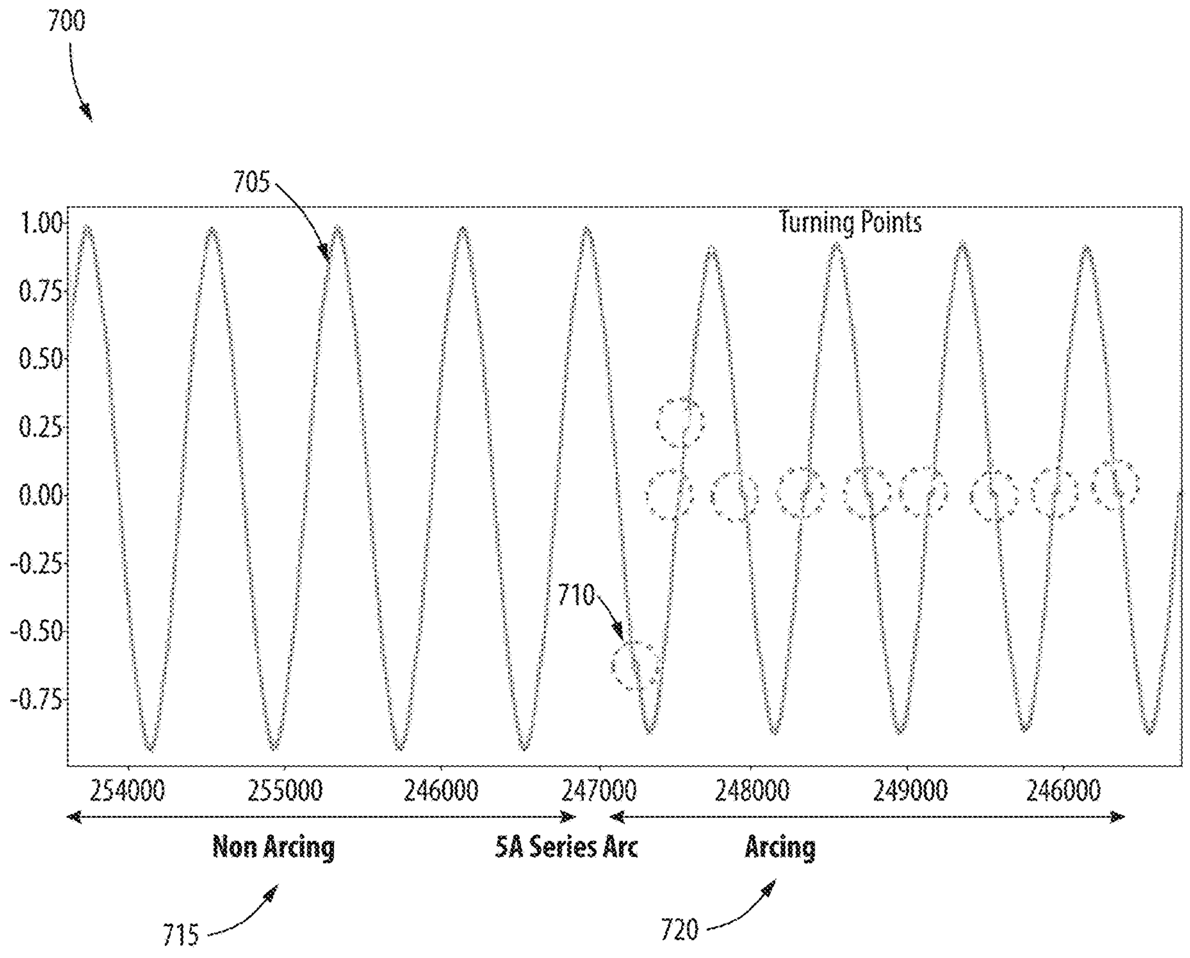
FIG. 7 is a graph illustrating turning points of a signal for an electrical load as the signal transitions from a non-arcing state to a series arcing state, according to some embodiments.

In some embodiments, when an electrical load is applied to the AFCI receptacle 100 (e.g., via an external load from the load terminals 230, 235), arcing characteristics indicative of an arc fault may be present in the line current measurements recorded by the first and second coils 520, 525. For example, FIG. 7 is a graph 700 illustrating an example alternating current (AC) signal 705 including turning points 710 for an electrical load as the AC signal 705 transitions from a non-arcing state 715 (e.g., a state in which no arc fault is present) to a series arcing state 720 (e.g., a state in which an arc fault is present). The AC signal 705 is a line current signal, indicative of the line current measurements, received by the arc fault detection circuit 530 and/or controller 310 from the first and second coils 520, 525. In particular, the AC signal 705 is representative of a 5 Ampere resistive load. As shown, the turning points 710 (illustrated as being within dashed circles) are local extremes within cycle peaks of the AC signal 705. The turning points 710 are indicative that an arc fault is present within the AC signal 705 as the AC signal 705 transitions from the non-arcing state 715 to the series arcing state 720 due to the sudden local changes in line current values within the cycle peaks of the AC signal 705. In addition, the position of the turning points 710 on the AC signal 705 relative to the zero cross points of the AC signal 705 is not constant.

Figure 8:
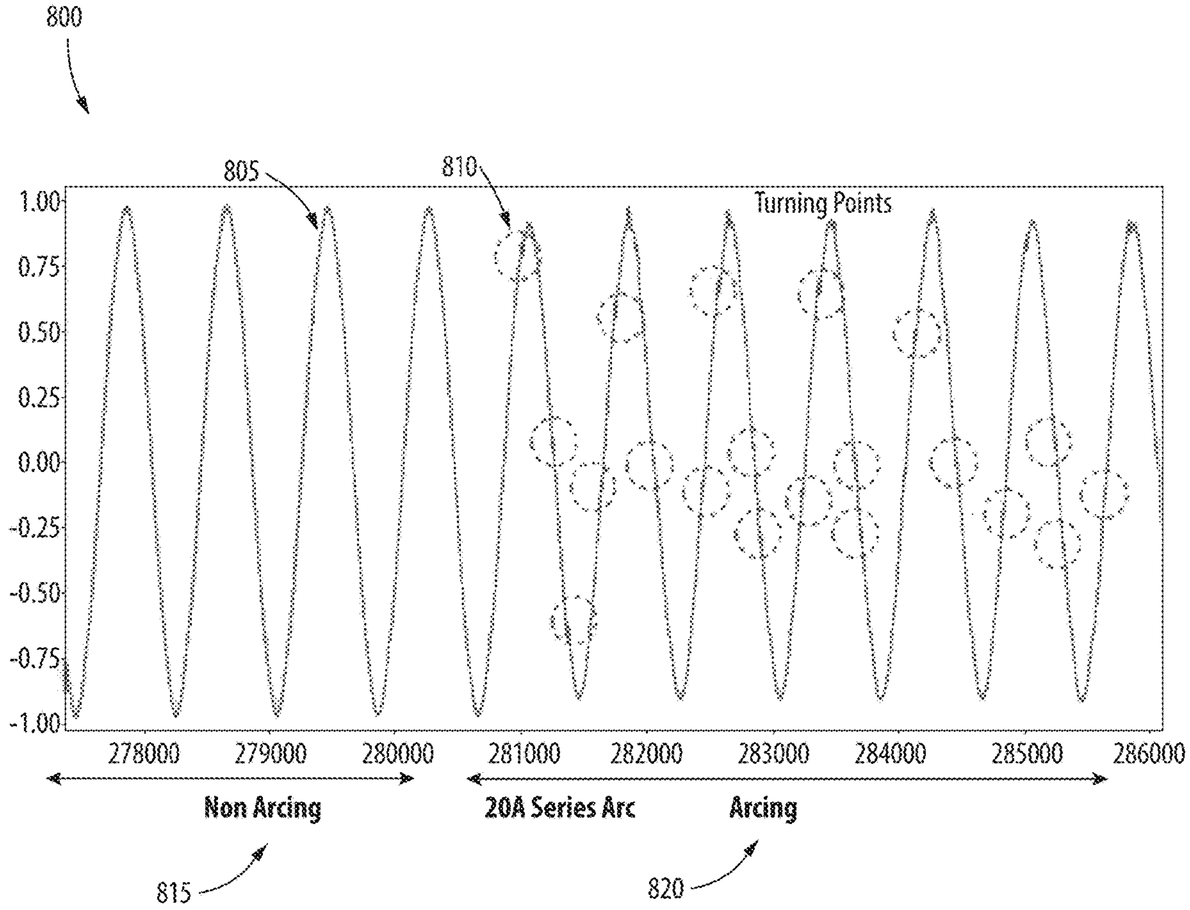
FIG. 8 is a graph illustrating turning points of a signal for an electrical load as the signal transitions from a non-arcing state to a series arcing state, according to some embodiments.

FIG. 8 is a graph 800 illustrating an example AC signal 805 including turning points 810 for an electrical load as the AC signal 805 transitions from a non-arcing state 815 to a series arcing state 820. The AC signal 805 is a line current signal, indicative of the line current measurements, received by the arc fault detection circuit 530 and/or controller 310 from the first and second coils 520, 525. In particular, the AC signal 805 is representative of a 20 Ampere resistive load. As shown, the turning points 810 (illustrated as being within dashed circles) are local extremes within cycle peaks of the AC signal 805. The turning points 810 are indicative that an arc fault is present within the AC signal 805 as the AC signal 805 transitions from the non-arcing state 815 to the series arcing state 820 due to the sudden local changes in line current values within the cycle peaks of the AC signal 805. In addition, the position of the turning points 810 on the AC signal 805 relative to the zero cross points of the AC signal 805 is not constant.

Figure 9:
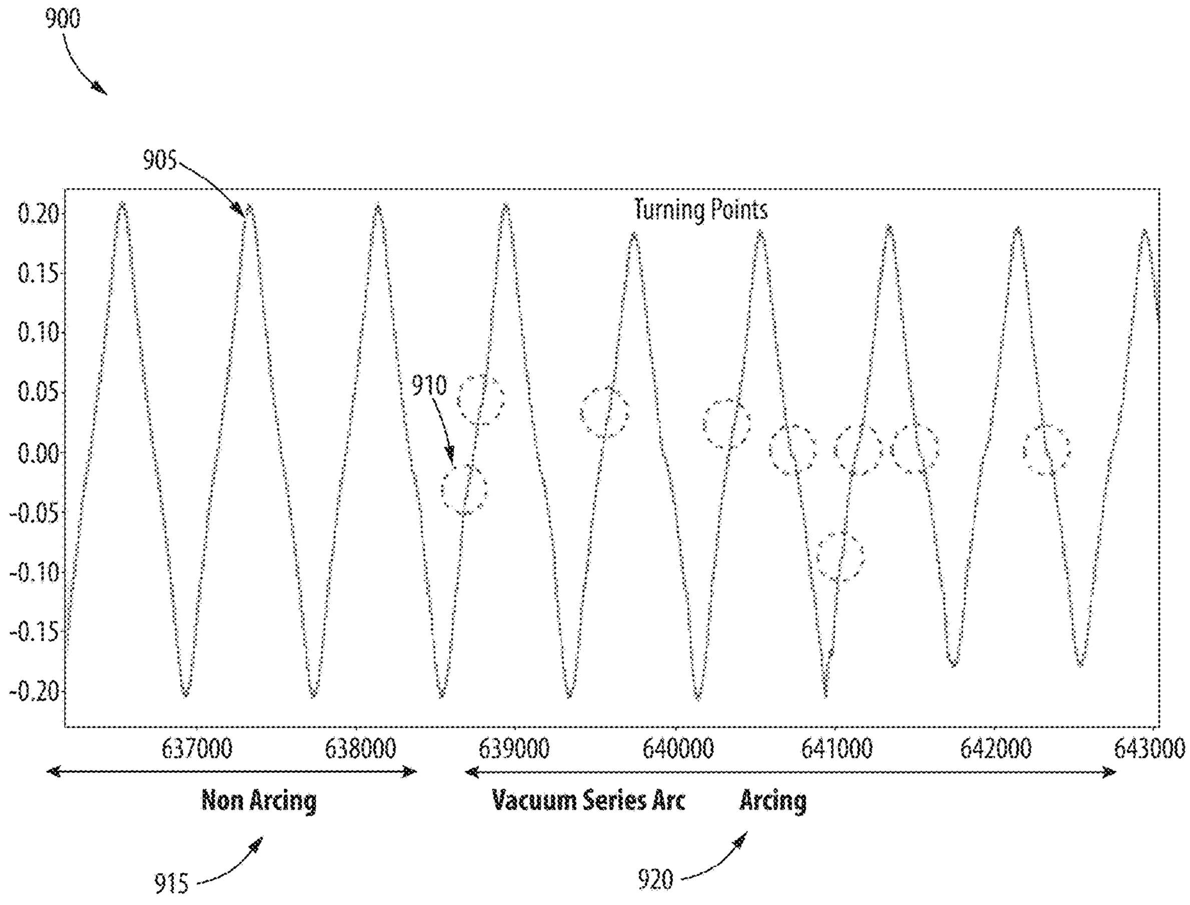
FIG. 9 is a graph illustrating turning points of a signal for an electrical load as the signal transitions from a non-arcing state to a series arcing state, according to some embodiments.

FIG. 9 is a graph 900 illustrating an example AC signal 905 including turning points 910 for an electrical load as the AC signal 905 transitions from a non-arcing state 915 to a series arcing state 920. The AC signal 905 is a line current signal, indicative of the line current measurements, received by the arc fault detection circuit 530 and/or controller 310 from the first and second coils 520, 525. In particular, the AC signal 905 is representative of an electrical load applied from a home appliance such as, for example, a vacuum. As shown, the turning points 910 (illustrated as being within dashed circles) are local extremes within cycle peaks of the AC signal 905. The turning points 910 are indicative that an arc fault is present within the AC signal 905 as the AC signal 905 transitions from the non-arcing state 915 to the series arcing state 920 due to the sudden local changes in line current values within the cycle peaks of the AC signal 905. In addition, the position of the turning points 910 on the AC signal 905 relative to the zero cross points of the AC signal 905 is not constant.

Figure 10:
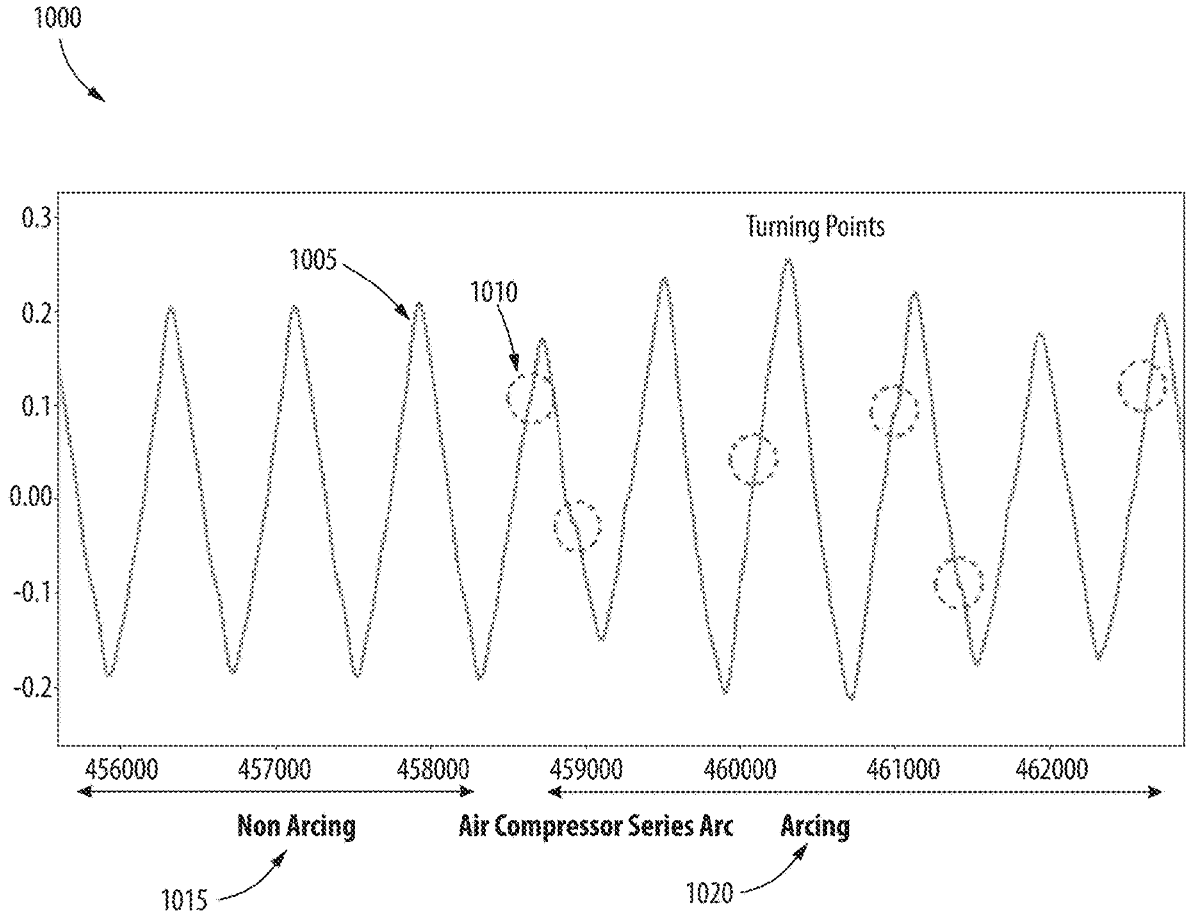
FIG. 10 is a graph illustrating turning points of a signal for an electrical load as the signal transitions from a non-arcing state to a series arcing state, according to some embodiments.

FIG. 10 is a graph 1000 illustrating an example AC signal 1005 including turning points 1010 for an electrical load as the AC signal 1005 transitions from a non-arcing state 1015 to a series arcing state 1020. The AC signal 1005 is a line current signal, indicative of the line current measurements, received by the arc fault detection circuit 530 and/or controller 310 from the first and second coils 520, 525. In particular, the AC signal 1005 is representative of an electrical load applied from a home appliance such as, for example, an air compressor. As shown, the turning points 1010 (illustrated as being within dashed circles) are local extremes within cycle peaks of the AC signal 1005. The turning points 1010 are indicative that an arc fault is present within the AC signal 1005 as the AC signal 1005 transitions from the non-arcing state 1015 to the series arcing state 1020 due to the sudden local changes in line current values within the cycle peaks of the AC signal 1005. In addition, the position of the turning points 1010 on the AC signal 1005 relative to the zero cross points of the AC signal 1005 is not constant.

Figure 11:
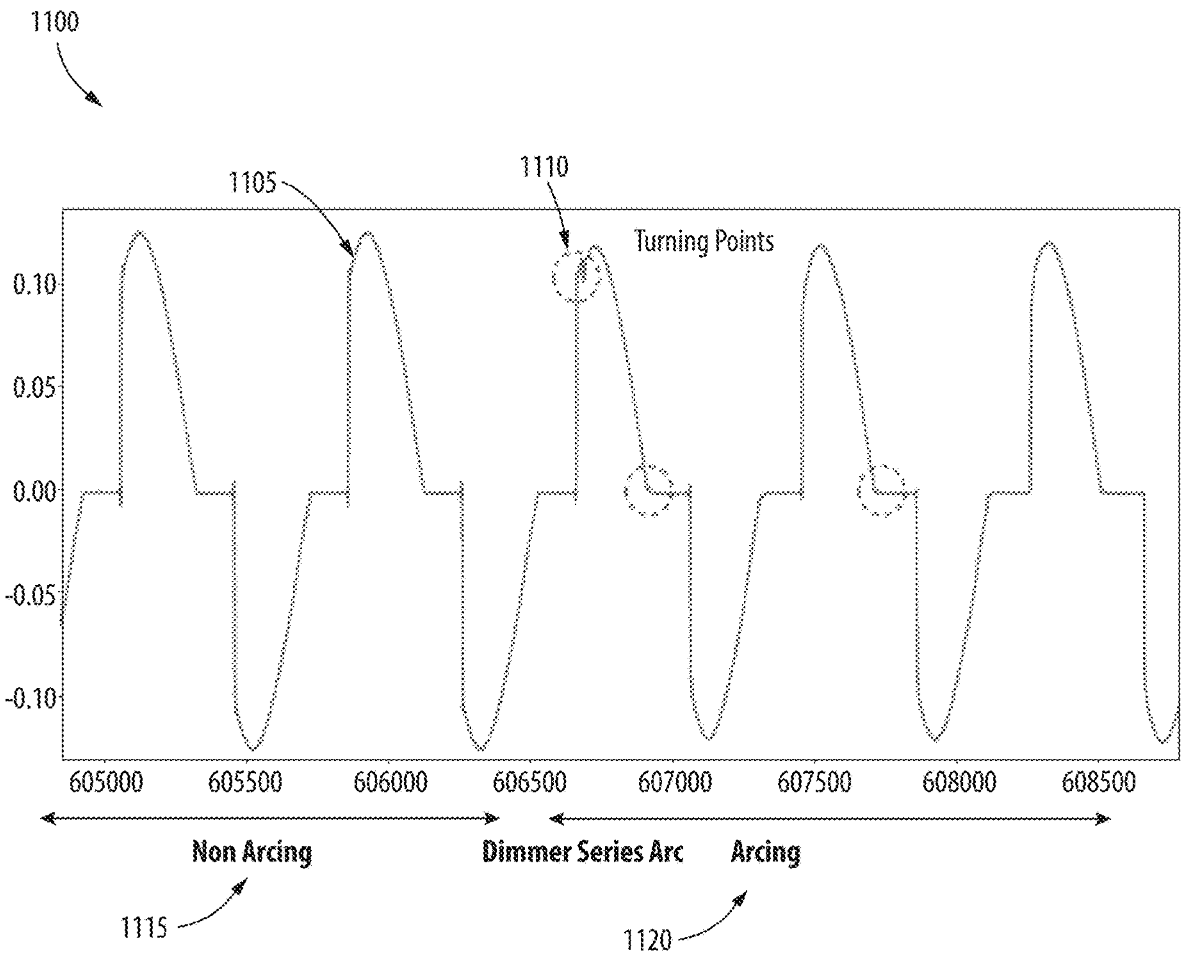
FIG. 11 is a graph illustrating turning points of a signal for an electrical load as the signal transitions from a non-arcing state to a series arcing state, according to some embodiments.

FIG. 11 is a graph 1100 illustrating an example AC signal 1105 including turning points 1110 for an electrical load as the AC signal 1105 transitions from a non-arcing state 1115 to a series arcing state 1120. The AC signal 1105 is a line current signal, indicative of the line current measurements, received by the arc fault detection circuit 530 and/or controller 310 from the first and second coils 520, 525. In particular, the AC signal 1105 is representative of a 1000 W dimmer switch load. As shown, the turning points 1110 (illustrated as being within dashed circles) are local extremes within cycle peaks of the AC signal 1105. The turning points 1110 are indicative that an arc fault is present within the AC signal 1105 as the AC signal 1105 transitions from the non-arcing state 1115 to the series arcing state 1120 due to the sudden local changes in line current values within the cycle peaks of the AC signal 1105. In addition, the position of the turning points 1110 on the AC signal 1105 relative to the zero cross points of the AC signal 1105 is not constant.

Figure 12:
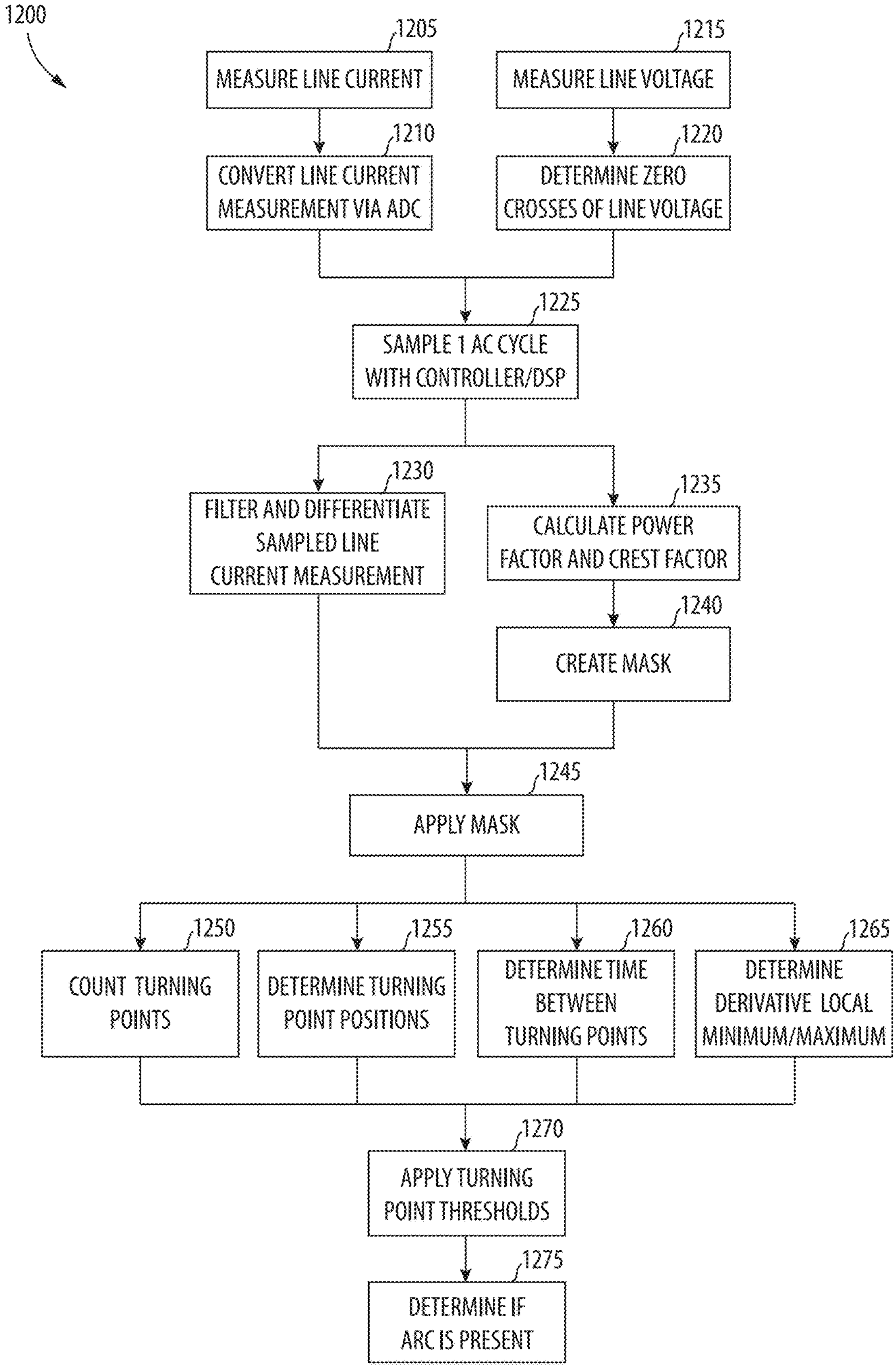
FIG. 12 is a flowchart of a method for detecting presence of an arc fault, according to some embodiments.

FIG. 12 is a flowchart of a method 1200 for detecting presence of an arc fault, according to some embodiments. For example, the method 1200 is implemented to detect whether an arc fault is present within the AFCI receptacle 100 and/or the circuit, including line terminals 220, 225, to which the AFCI receptacle 100 is connected. It should be understood that the order of the steps disclosed in method 1200 could vary. Although some steps are illustrated as occurring in parallel order, in other embodiments, the steps disclosed may be performed in serial order. Furthermore, additional steps may be added to the process and not all of the steps may be required.

In one embodiment, the method 1200 is performed by an electronic controller, such as the controller 310. However, in other embodiments, the method 1200 may be performed via other components within the control system 600, such as the arc fault detection circuit 530, or a combination of the controller 310 and the arc fault detection circuit 530.

At step 1205, a current sensor, such as but not limited to the first and second coils 520, 525, measures the current (e.g., a line current) flowing through line terminals 220, 225. As described above, in some embodiments, the first and second coils 520, 525 measure the current flowing through load terminals 230, 235 instead. In some embodiments, the first and second coils 520, 525 measure the current flowing through line terminals 220, 225 and third and further coils measure the current flowing through load terminals 230, 235. Current measurements are provided to the arc fault detection circuit 530 and/or controller 310 for digitization and further processing and analysis.

At step 1210, an analog-digital converter (ADC) (for example, an ADC of the arc fault detection circuit 530) converts the current measurements from the first and second coils 520, 525 to a digital current signal (e.g., a line current measurement signal). For example, the ADC receives an analog signal indicative of the current measurements from the first and second coils 520, 525 and converts the analog signal to the line current measurement signal to provide to the controller 310. In some embodiments, the ADC is a separate component included in control system 600.

At step 1215, the zero cross detection circuit 602 measures the voltage and frequency of line terminals 220, 225. In some embodiments, the zero cross detection circuit 602 measures the voltage and frequency of the load terminals 230, 235 instead. In some embodiments, the zero cross detection circuit 602 measures the voltage and frequency of the both the line terminals 220, 225 and the load terminals 230, 235. As described above, the zero cross detection circuit 602 may be implemented as a separate circuit, integrated within arc fault detection circuit 530, or integrated within controller 310. Voltage and frequency measurements (e.g., a line voltage measurement signal) are provided to the arc fault detection circuit 530 and/or controller 310 for further processing and analysis.

At step 1220, the controller 310 determines a plurality of zero cross positions of the line voltage measurement signal. In some embodiments, the line voltage measurement signal is converted to a digital line voltage measurement signal via the ADC. In some embodiments, the zero cross detection circuit 602 determines the plurality of zero cross positions. In such embodiments, the zero cross detection circuit 602 transmits the line voltage measurement signal including the plurality of zero cross positions to the controller 310.

At step 1225, the controller 310 samples 1 AC cycle each from the line current measurement signal and the line voltage measurement signal including the plurality of zero cross positions. For example, the controller 310 receives the line current measurement signal from the ADC and the line voltage measurement signal including the plurality of zero cross positions from the zero cross detection circuit 602. The controller 310 samples the 1 AC cycle such that the controller 310 only considers a portion (e.g., a window) of the line current measurement signal and the line voltage measurement signal including a positive peak and a negative peak of the line current measurement signal and the line voltage measurement signal. In some embodiments, the ADC is phase locked to the frequency of the line voltage measurement signal such that a frequency of the line current measurement signal corresponds to the frequency of the line voltage measurement signal. In addition, the controller 310 may dynamically determine which AC cycle to sample from the line current measurement signal and the line voltage measurement signal based on a power factor, a crest factor, and/or a symmetry of the line current measurement signal. In other embodiments, the controller 310 samples one or more ½ AC cycles each from the line current measurement signal and the line voltage measurement signal.

Figure 16:
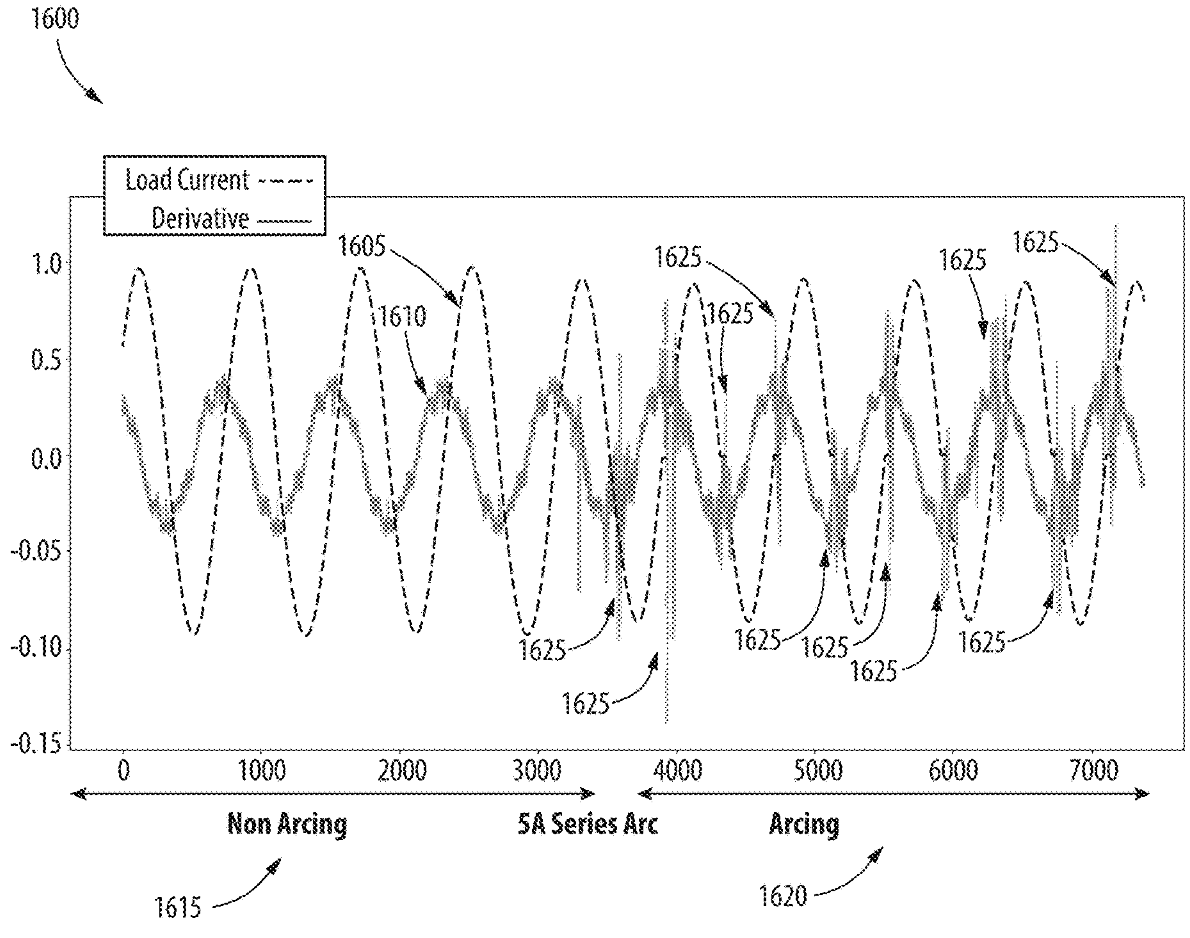
FIG. 16 is a graph illustrating a line current signal and a filtered line current signal, according to some embodiments.

At step 1230, the controller 310 applies a digital filter to the line current measurement signal to differentiate turning points in the line current measurement signal (FIG. 16). That is, the digitized line current measurements are filtered. In some embodiments, the arc fault detection circuit 530 applies digital filters to the line current measurement signals. In some embodiments, the controller 310 is further configured to implement multi-rate analysis (e.g., down-sampling/decimation and up-sampling/interpolation) to optimize the digital filters applied to the line current measurement signals. The controller 310 estimates a derivative of the line current measurement signal in discrete time by applying the digital filter to the sampled and digitized form of the line current measurement signal.

In some embodiments, the filter differentiates between the 1 AC cycle sample (step 1225) and a previous sample of the line current measurement signal (e.g., a Two Tap Type IV FIR filter). In some embodiments, Type III or Type IV FIR (odd or even asymmetric filters) high pass or bandpass filters are applied via the controller 310. Type III or Type IV FIR filters may be preferable to Type I and Type II filters because, in some instances, Type I and Type II filters produce ringing artifacts in the filtered signal. Additionally, the controller 310 adjusts the number of taps in the applied filter to increase or decrease an amount of high frequency noise present in the estimated derivative of the line current measurement signal. In some embodiments, the controller 310 applies the filter to differentiate the line current measurement and determine the turning points in the line current measurement signal where the estimated derivative is zero and/or where the derivative changes from positive to negative or from negative to positive. In some embodiments, the following equations may be used to represent where the turning points are defined based on the differentiation of the line current measurement signal:

Local Maximum — Equation 1

$$f'(x)=0$$

$$f'(x-r)>0$$

$$f'(x+r)<0$$

Local Minimum — Equation 2

$$f'(x)=0$$

$$f'(x-r)<0$$

$$f'(x+r)>0$$

where f(x) is the line current measurement signal, f'(x) is the estimated derivation of the line current measurement signal, x is a point in time on the line current measurement signal, and r is a small positive number.

At step 1235, the controller 310 calculates a power factor and a crest factor of the digitized and filtered line current measurement signal. In some embodiments, the power factor is a ratio of a real power absorbed by the load (e.g., the external load connected to the outlet 625) to the apparent power flowing through the control system 600. In some embodiments, the crest factor is a ratio of peak values of the line current measurement signal to an effective value (e.g., an average value or a root mean square (RMS) value) of the line current measurement signal.

Figure 17:
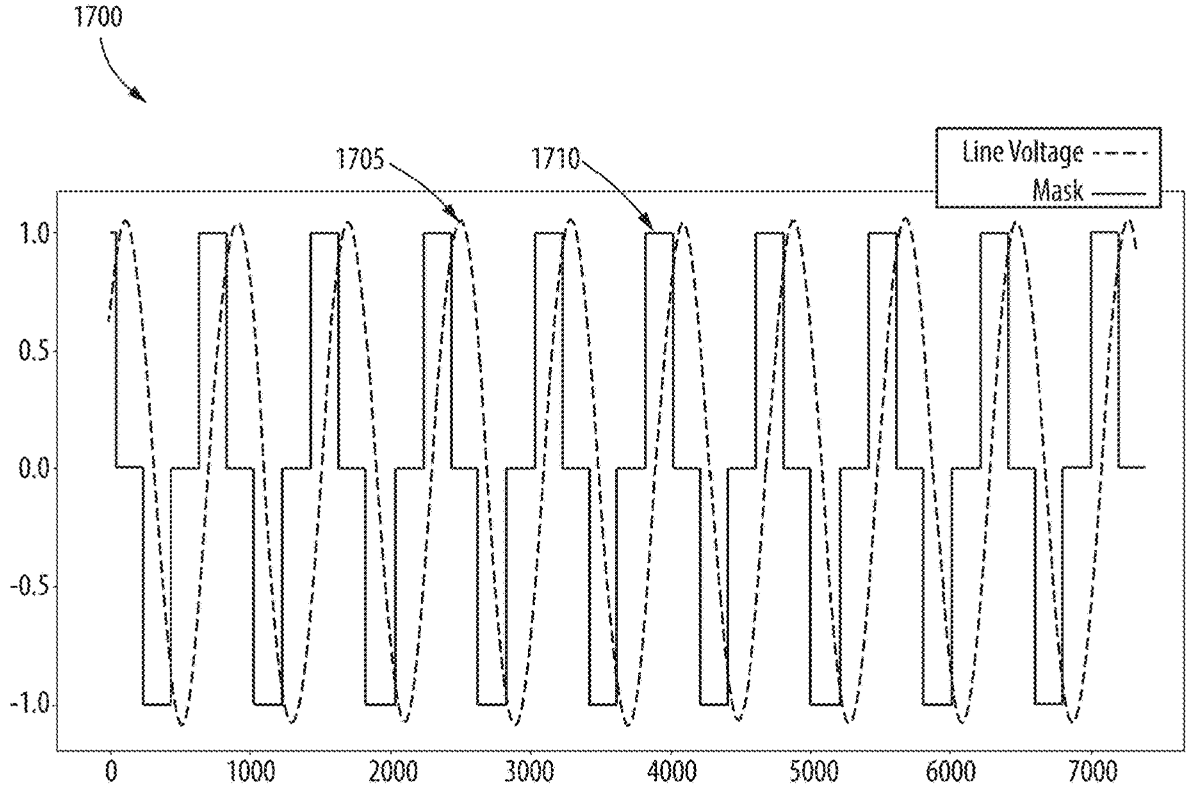
FIG. 17 is a graph illustrating a line voltage signal and a mask created from the line voltage signal, according to some embodiments.

At step 1240, the controller 310 creates a mask (e.g., a filter) based on the line voltage measurement signal (FIG. 17). The controller 310 may apply the mask to the digitized and filtered line current measurement signal to normalize the line current measurement signal. By normalizing the line current measurement signal, the mask zeroes out absolute peaks of the line current measurement signal (e.g., for each sampled AC cycle) such that only the turning points are present in the line current measurement signal.

Figure 18:
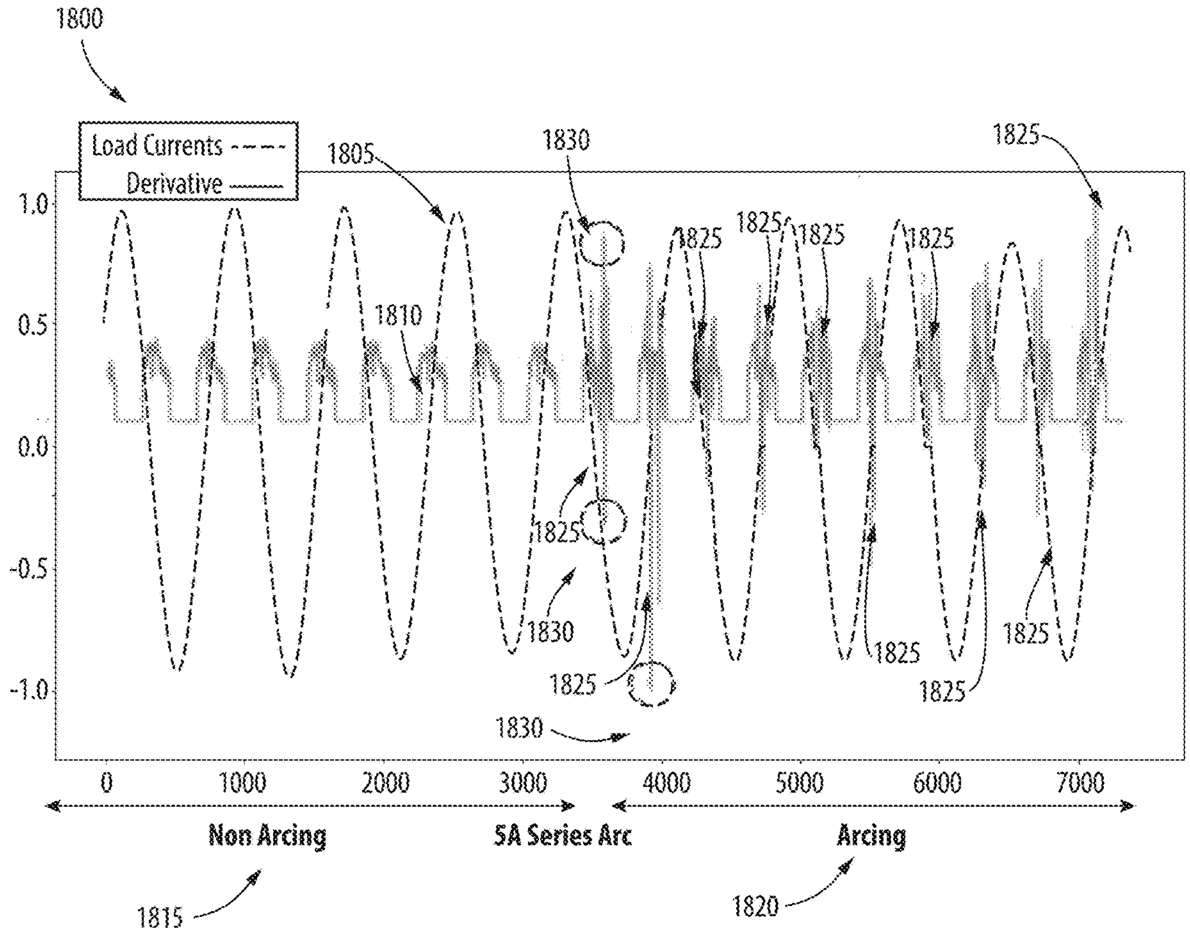
FIG. 18 is a graph illustrating a line current signal and a masked filter output, according to some embodiments.

At step 1245, the controller 310 applies the mask to the line current measurement signal (FIG. 18). In some embodiments, the controller 310 can dynamically adjust properties of the mask based on the determined power factor, the determined crest factor, and a symmetry of the line current measurement signal.

At step 1250, the controller 310 counts a plurality of turning points of the filtered line current measurement signal based on the masked output of step 1245. In some embodiments, the plurality of turning points correspond to points in the masked output of the filtered line current measurement signal where the masked output drops below zero (e.g., the masked derivative of the line current measurement signal is less than zero).

At step 1255, the controller 310 determines a position of each turning point of the plurality of turning points relative to a corresponding zero cross position of the plurality of zero cross positions. For example, the controller 310 may determine the position of each turning point of the masked output relative to the nearest zero cross position for each turning point.

At step 1260, the controller 310 determines a time between each turning point of the plurality of turning points. For example, the controller 310 determines a time between each turning point of the plurality of turning points and the subsequent turning point of the plurality of turning points. In some embodiments, the controller 310 determines the time between turning points based on a period between each turning point determined by the oscilloscope 645.

At step 1265, the controller 310 determines a local extreme derivative value (FIG. 18) around each turning point. In some embodiments, the local extreme derivative value is a local maximum value or a local minimum value at AC cycle peaks of the derivative signal, for example the filtered signal of step 1230. In some embodiments, the local extreme derivative value may include multiple values (e.g., a local minimum value and a local minimum value around each turning point.) For example, the controller 310 determines the local extreme derivative value (or multiple local extreme derivative values) around the determined position of each counted turning point, as described in steps 1250 and 1255 above.

At step 1270, the controller 310 applies turning point thresholds to the plurality of turning points, the positions the plurality of turning points relative to the corresponding zero cross positions, the time between each turning point of the plurality of turning points, and/or the local extreme derivative value around each turning point. For example, the turning point thresholds include one or more turning point thresholds such as, but not limited to, an upper turning point threshold relative to the counted turning points, a lower turning point threshold relative to the counted turning points, an upper position threshold, a lower position threshold, an upper time threshold, a lower time threshold, an upper extreme derivative value threshold, and/or a lower extreme derivative value threshold. In addition, the controller 310 compares the plurality of turning points to the upper turning point threshold and the lower turning point threshold. The controller 310 also compares the positions of the plurality of turnings points relative to the corresponding zero cross positions to the upper position threshold and the lower position threshold. Likewise, the controller 310 compares the time between each turning point of the plurality of turning points to the upper time threshold and the lower time threshold. Similarly, the controller 310 compares the local extreme derivative value around each turning point to the upper extreme derivative value threshold and the lower extreme derivative value threshold. In some embodiments, the controller 310 is configured to apply the turning point thresholds based on a correlation between the line current measurement signal and a reference waveform, such as the correlation-based arc fault detection method described in U.S. Pat. No. 10,243,343, issued Mar. 26, 2019, and entitled "SYSTEMS AND METHODS FOR DETECTING AND IDENTIFYING ARCING BASED ON NUMERICAL ANALYSIS," the entire content of which is hereby incorporated by reference. In some embodiments, the controller 310 is configured to apply the turning point thresholds based on a spectral energy of the line current measurement signal, such as the arc fault detection methods described in U.S. patent application Ser. No. 18/106,854, filed Feb. 7, 2023, and entitled "ARC FAULT DETECTION THROUGH MIXED-SIGNAL MACHINE LEARNING AND NEURAL NETWORKS," the entire content of which is hereby incorporated by reference. In some embodiments, the turning point thresholds are determined by a machine learning model stored in the memory 620 of the controller 310.

At step 1275, the controller 310 determines whether an arc fault is present within the AFCI receptacle 100 and/or the circuit, including line terminals 220, 225. For example, the controller 310 determines whether an arc fault is present based on the plurality of turning points, the position of each turning point relative to the corresponding zero cross position, the time between each turning point and the subsequent turning point and the local extreme derivative value around each of the plurality of turning points. In some embodiments, the controller 310 determines whether an arc fault is present based on the comparison of step 1270. As such, when the controller 310 determines that the counted plurality of turning points is greater than the upper turning point threshold or less than the lower turning point threshold, the controller 310 determines that an arc fault is present. When the controller 310 determines that the position of at least one of the plurality of turning points relative to the corresponding zero cross position is greater than the upper position threshold or less than the lower position threshold, the controller 310 determines that an arc fault is present. Likewise, when the controller 310 determines that the time between at least one of the plurality of turning points and the subsequent turning point is greater than the upper time threshold or less than the lower time threshold, the controller 310 determines that an arc fault is present. Similarly, when the controller 310 determines that the local extreme derivative value around each turning point is greater than the upper extreme derivative value threshold or less than the lower extreme derivative value threshold, the controller 310 determines that an arc fault is present. In some embodiments, when the controller 310 determines that an arc fault is present, the controller 310 activates the interrupting device 210. It should be understood that after the controller 310 determines whether an arc fault is present at step 1275, the method 1200 can be repeated for each AC cycle of the line current measurement signal. In some embodiments, after the controller 310 determines whether an arc fault is present at step 1275, the method 1200 returns to step 1205 to continuously monitor whether an arc fault is present.

Figure 13:
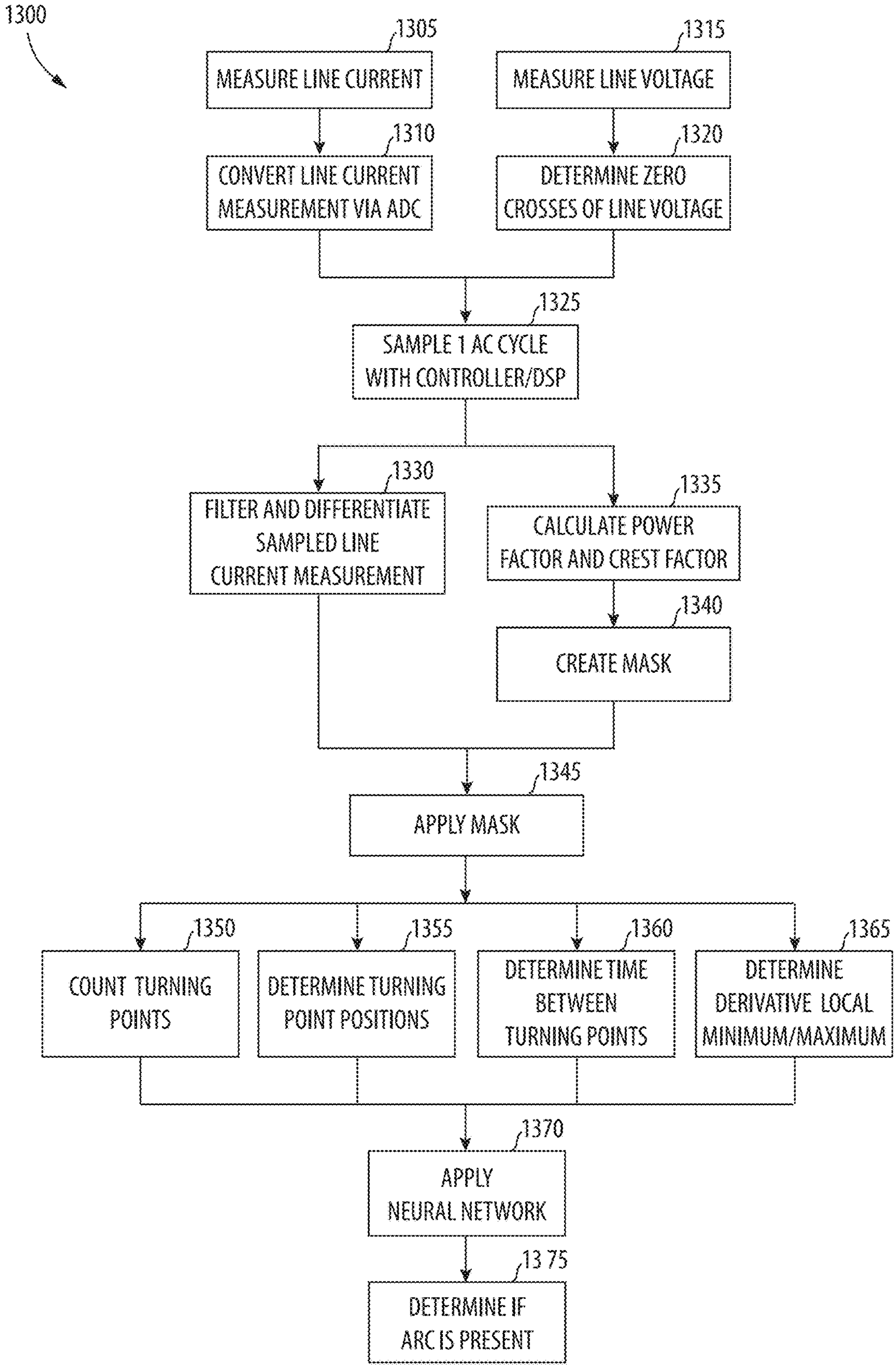
FIG. 13 is a flowchart of a method for detecting presence of an arc fault, according to some embodiments.

FIG. 13 is a flowchart of a method 1300 for detecting presence of an arc fault, according to some embodiments. For example, the method 1300 is implemented to detect whether an arc fault is present within the AFCI receptacle 100 and/or the circuit, including line terminals 220, 225, to which the AFCI receptacle 100 is connected. It should be understood that the order of the steps disclosed in method 1300 could vary. Although some steps are illustrated as occurring in parallel order, in other embodiments, the steps disclosed may be performed in serial order. Furthermore, additional steps may be added to the process and not all of the steps may be required.

In one embodiment, the method 1300 is performed by an electronic controller, such as the controller 310. However, in other embodiments, the method 1300 may be performed via other components within the control system 600, such as the arc fault detection circuit 530, or a combination of the controller 310 and the arc fault detection circuit 530.

As shown in FIG. 13, the method 1300 includes many of the same steps as the method 1200. That is, steps 1305-1365 of the method 1300 are the same as steps 1205-1265 of the method 1200. However, at step 1370, the controller 310 applies a neural network to the plurality of turning points, the positions the plurality of turning points relative to the corresponding zero cross positions, the time between each turning point of the plurality of turning points, and/or the local extreme derivative value around each turning point based on a machine learning model stored in the memory 620. For example, the controller 310 executes the machine learning model to train the neural network. Training the neural network includes developing one or more thresholds, weights, and/or biases based on sample turning point and non-turning point data sets. For example, one or more of the thresholds described above with respect to the method 1200 (e.g., the upper turning point threshold, the lower turning point threshold, the upper position threshold, the lower position threshold, the upper time threshold, the lower time threshold, the upper extreme derivative value threshold, the lower extreme derivative value threshold, etc.) during training, testing, validation, or creation, of the neural network. In some embodiments, the controller 310 is configured to execute the machine learning model (and deploy the neural network) to detect arc faults, such as the arc fault detection methods described in U.S. patent application Ser. No. 18/106,854, filed Feb. 7, 2023, and entitled "ARC FAULT DETECTION THROUGH MIXED-SIGNAL MACHINE LEARNING AND NEURAL NETWORKS," the entire content of which is hereby incorporated by reference.

Figure 14:
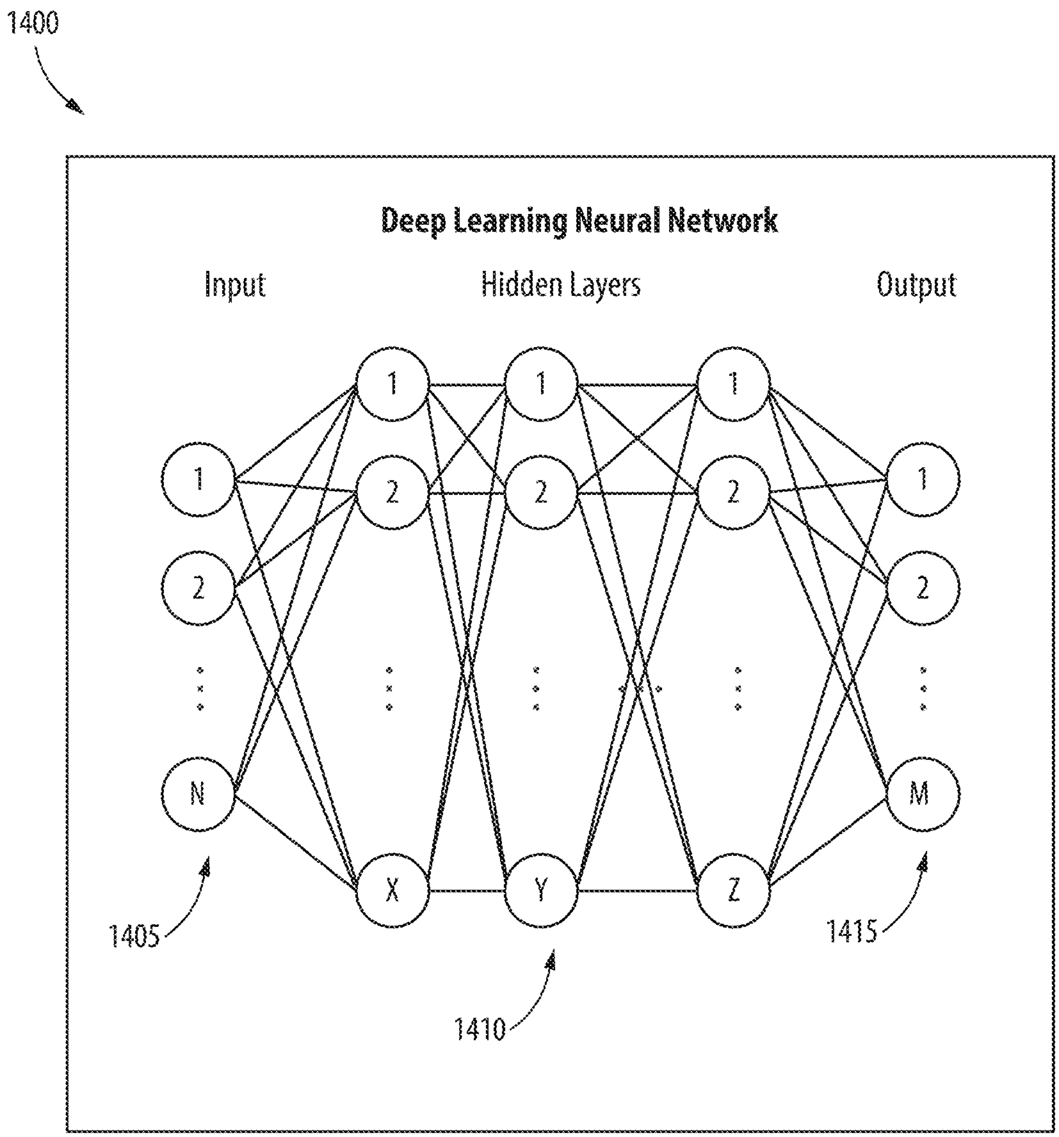
FIG. 14 illustrates a schematic of a machine learning model, according to some embodiments.

At step 1375, the controller 310 determines whether an arc fault is present within the AFCI receptacle 100 and/or the circuit, including line terminals 220, 225. For example, the controller 310 determines whether an arc fault is present based on an output of applying the neural network of step 1370. As such, the neural network may be configured to label the turning points of the line current measurement signal. Based on the plurality of turning points, the positions the plurality of turning points relative to the corresponding zero cross positions, the time between each turning point of the plurality of turning points, and/or the local extreme derivative value around each turning point, the neural network calculates a probability of whether the arc fault is present, as described in more detail below with reference to FIGS. 14 and 15. In some embodiments, when the controller 310 determines that an arc fault is present, the controller 310 activates the interrupting device 210. It should be understood that after the controller 310 determines whether an arc fault is present at step 1375, the method 1300 can be repeated for each AC cycle of the line current measurement signal. In some embodiments, after the controller 310 determines whether an arc fault is present at step 1375, the method 1300 returns to step 1305 to continuously monitor whether an arc fault is present In some embodiments, the controller 310 is configured to execute a machine learning model when predicting the presence of an arc fault based on determined arcing characteristics (e.g., the turning points) of the line current. For example, FIG. 14 illustrates a generic structure of a machine learning model 1400. The machine learning model 1400 is depicted as a neural network; however, the machine learning model may be implemented as any one or more of a deep learning algorithm, a neural network, a support-vector machine, and a long short-term memory.

As shown, N arcing features, or characteristics, of the line current measurement signal, such as the plurality of turning points, the positions the plurality of turning points relative to the corresponding zero cross positions, the time between each turning point of the plurality of turning points, and/or the local extreme derivative value around each turning point may be provided as inputs 1405 to the machine learning model 1400. The machine learning model 1400 further includes multiple hidden layers 1410, each hidden layer 1410 including an independent number of neurons. For example, the machine learning model 1400 may include 2-4 hidden layers 1410 with 2-256 nodes per layer. The hidden layers 1410 are configured to generate M outputs 1415 based on one or more weights, biases, and/or thresholds associated with the arcing characteristics provided as inputs 1405. As will be described in more detail below, the weights, biases, and/or thresholds that are used to calculate the outputs 1415 are generated using a supervised training algorithm that may executed by an external device, such as the external device 635. The outputs 1415 represent the probability of a binary, or multi-class classification, of the load current that includes arc fault, normal operation, and/or other classifications of the load. That is, the outputs 1415 indicate whether the load current is, or is likely to be, experiencing an arc fault condition or a normal operating condition. In some embodiments, the outputs 1415 include a probability of an arc fault being present within AFCI receptacle 100 and/or the circuit to which AFCI receptacle 100 is connected. In such embodiments, the controller 310 is configured to determine that an arc fault is present when the probability exceeds a probability threshold. In some embodiments, the probability threshold is a configurable value determined by a user. In other embodiments, the probability threshold is determined during creation of the machine learning model 1400.

In some embodiments, the controller 310 is configured to implement more than one arc fault detection method when determining whether an arc fault is present within the AFCI receptacle 100 and/or the circuit to which the AFCI receptacle 100 is connected, according to some embodiments. For example, the controller 310 may be configured to implement a machine learning, probability-based arc fault detection method, such as methods that are similar to the method described above with respect to method 1300. In some embodiments, the controller 310 is further configured to implement a correlation-based arc fault detection method, such as the arc fault detection methods described in U.S. Patent Application Publication No. 2020/0036183, published Jan. 30, 2020, and entitled "SYSTEM AND METHOD FOR DISCERNING ARCING IN ELECTRICAL WIRING," the entire content of which is hereby incorporated by reference. In some embodiments, the controller 310 is configured to implement the correlation-based arc fault detection methods described in U.S. Patent Application Publication No. 2020/0264234, published Aug. 20, 2020, and entitled "APPARATUSES AND METHODS FOR PASSIVE FAULT MONITORING OF CURRENT SENSING DEVICES IN PROTECTIVE CIRCUIT INTERRUPTERS," the entire content of which is hereby incorporated by reference.

Figure 15:
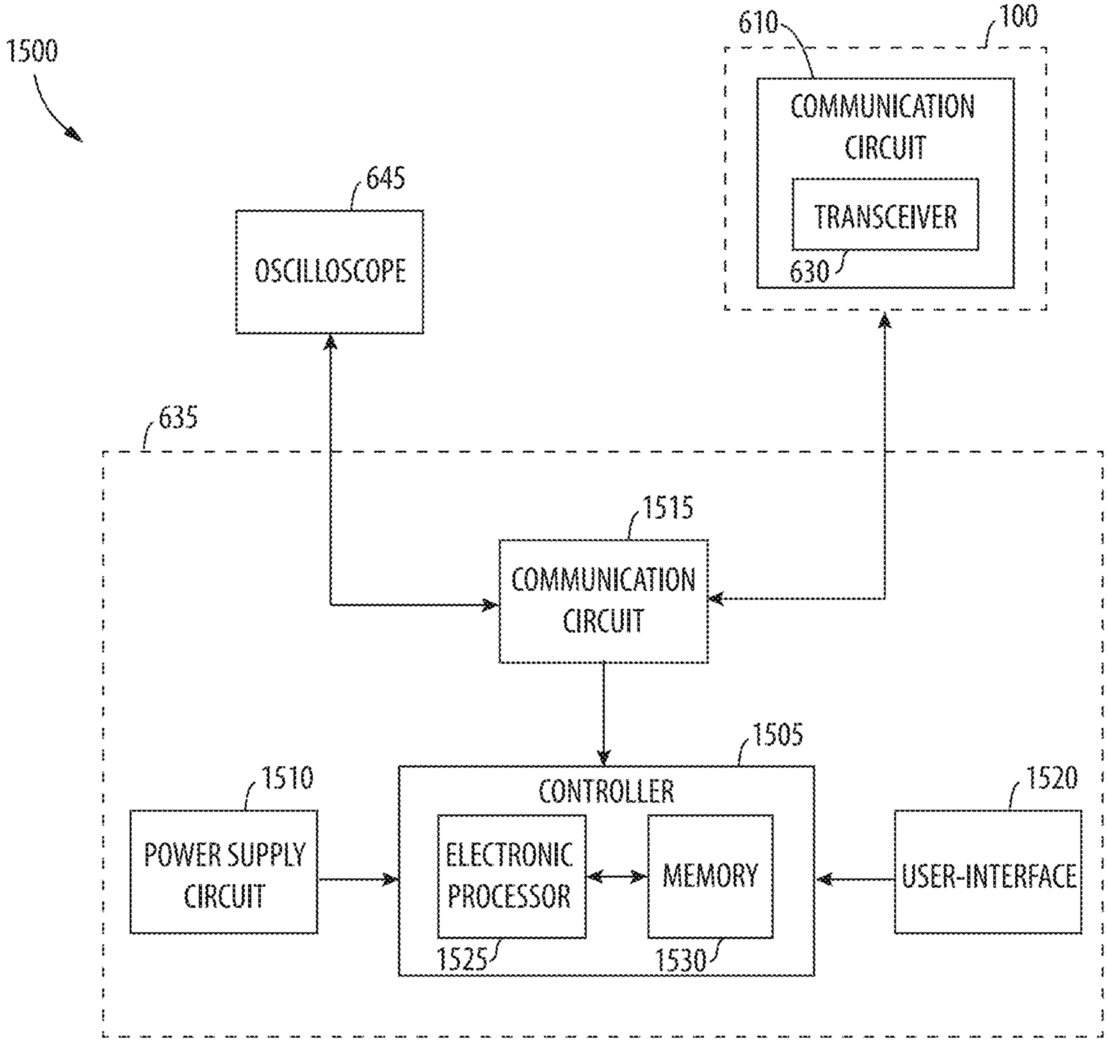
FIG. 15 illustrates a block diagram of a control system of an external device illustrated in FIG. 6, according to some embodiments.

FIG. 15 is a block diagram of a control system 1500 of the external device 635 used to create machine learning model 1400, in accordance with some embodiments. As described above, the external device 635 may be implemented as one or more of, a computer terminal, a desktop, a laptop, a smartphone, a tablet, a server, or any other electronic device that includes a memory and an electronic processor capable of training a machine learning model.

As shown, the control system 1500 of the external device 635 includes a controller 1505. The controller 1505 is electrically and/or communicatively connected to a variety of modules or electronic components of the external device 635. For example, the controller 1505 is connected to a power supply circuit 1510, a communication circuit 1515, and a user-interface 1520.

The controller 1505 includes a plurality of electrical and electronic components that provide power, operational control, and protection to the components and modules within the controller 1505 and/or the external device. For example, the controller includes, among other things, an electronic processor 1525 and a memory 1530.

The memory 1530 includes, for example, a program storage area and a data storage area. The program storage area and the data storage area can include combinations of different types of memory, such as read-only memory (ROM) and random access memory (RAM). Various non-transitory computer readable media, for example, magnetic, optical, physical, or electronic memory may be used. The electronic processor 1525 is communicatively coupled to the memory 1530 and executes software instructions that are stored in the memory 1530, or stored in another non-transitory computer readable medium such as another memory or a disc. The software may include one or more applications, program data, filters, rules, one or more program modules, and other executable instructions. For example, the software includes one or more programs for training machine learning models.

The power supply circuit 1510 is configured to supply power to the controller 1505 and/or other components of the external device 635. In some embodiments, the power supply circuit 1510 receives power from a power source (e.g., a battery, mains power, etc.) and provides regulated power to the controller 1505 and/or other components of the external device 635. In some constructions, the power supply circuit 1510 includes DC-DC converters, AC-DC converters, DC-AC converters, and/or AC-AC converters. In some embodiments, the power supply circuit 1510 receives power from an AC power source (for example, an AC power outlet).

The communication circuit 1515 enables the external device 635 to communicate with the communication circuit 610 of AFCI receptacle 100 and the oscilloscope 645. In some embodiments, the communication circuit 1515 wirelessly communicates with the communication circuit 610 of AFCI receptacle 100 and/or oscilloscope 645. In some embodiments, the communication circuit 1515 uses a wired connection to communicate with the AFCI receptacle 100 and/or oscilloscope 645. In some embodiments, the communication circuit 1515 is capable of both wireless and wired communication with the communication circuit 610 of AFCI receptacle 100 and oscilloscope 645. In some embodiments, the communication circuit 1515 includes, for example, a transceiver that includes and/or is coupled to an antenna. In some embodiments, the communication circuit 1515 includes a port configured to receive a wired connection.

In some embodiments, the communication circuit 1515 communicates with the communication circuit 610 of AFCI receptacle 100 and/or the oscilloscope 645 using a network. The network is, for example, a wide area network (WAN) (e.g., the Internet, a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network includes one or more of a wide area network (WAN), a local area network (LAN), a neighborhood area network (NAN), a home area network (HAN), or personal area network (PAN). In some embodiments, the communication circuit 1515 communicates using a wired connection.

The user-interface 1520 is configured to receive input from a user and/or output information to the user concerning the AFCI receptacle 100 and/or the machine learning model 1400. The user-interface 1520 includes a display (for example, a primary display, a secondary display, etc.) and/or input devices (for example, a keyboard, a touch-screen display, a plurality of knobs, dials, switches, buttons, etc.). The display may be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc.

FIG. 16 is a graph 1600 illustrating a line current measurement signal 1605 and a filtered line current measurement signal 1610 as the line current measurement signal 1605 transitions from a non-arcing state 1615 to an arcing state 1620, according to some embodiments. In particular, the line current measurement signal 1605 is representative of the example 5 Ampere resistive load, as described above with reference to FIG. 7. The filtered line current measurement signal 1610 is representative of the line current measurement signal 1605 after the controller 310 applies a filter, for example, as described above in steps 1230 and 1330. As shown in FIG. 16, the controller 310 applies a 9 Tap Type III FIR filter. As described above, in some embodiments, other filters may be applied. Turning points 1625 in the filtered line current measurement signal 1610 can be visualized as points in the estimated derivative of the line current measurement signal 1605 where the estimated derivative is zero and/or where the derivative changes from positive to negative or from negative to positive, indicating an arc fault.

FIG. 17 is a graph 1700 illustrating a line voltage measurement signal 1705 and a mask (e.g., filter) 1710 created from the line voltage measurement signal 1705, according to some embodiments. For example, the mask 1710 is created and applied by the controller 310 as described above in steps 1240, 1245, 1340, and 1345 to normalize the filtered line current measurement signal (e.g., the filtered line current measurement signal 1610). As shown in FIG. 17, the mask 1710 is 0 around positive and negative peaks of the line voltage measurement signal 1705. The mask 1710 is 1 when an estimated derivative of the line voltage measurement signal 1705 is positive and −1 when the estimated derivative of the line voltage measurement signal 1705 is negative. As described above with reference to FIG. 12, the properties of the mask 1710 are adjusted dynamically by the controller 310 based on the properties of the line current measurement signal such as crest factor, power factor, and/or symmetry of the line current measurement signal. For example, the controller 310 shifts the 0 portion of the mask 1710 relative to the plurality of zero cross positions in time based on the power factor of the line current measurement signal. The controller 310 adjusts the duration of the 0 portion of the mask 1710 based on the crest factor of the line current measurement signal. In addition, the duration of time where the mask 1710 is 1 or −1 need not be symmetrical about each zero cross position of the plurality of zero cross positions if the line current measurement signal is not symmetric about each zero cross position (for example, a dimmer type of phase control type loads as illustrated in FIG. 11). As such, the mask 1710 further filters the filtered line current measurement signal 1610 by zeroing out the positive and negative peaks of the filtered line current measurement signal 1610 and isolating the turning points (e.g., the turning points 1625).

FIG. 18 is a graph 1800 illustrating a line current measurement signal 1805 and a masked filter output 1810 as the line current measurement signal 1805 transitions from a non-arcing state 1815 to an arcing state 1820, according to some embodiments. In some embodiments, the line current measurement signal 1805 is the same as the line current measurement signal 1605 as described above with reference to FIG. 16. In addition, in some embodiments, the masked filter output 1810 is an output signal of the controller 310 when the controller 310 applies the mask 1710 to the filtered line current measurement signal 1610. The controller 310 counts and determines the position of turning points 1825 based the zero crosses of the masked filter output 1810. As shown in FIG. 18, each of the turning points 710 circled in FIG. 7 corresponds to a point where the masked filter output 1810 drops below 0. In addition, the controller 310 may determine local extreme derivative values 1830 around each turning point of the turning points 1825, as described above in reference to step 1265 of the method 1200 and step 1365 of the method 1300.

Thus, the disclosure provides, among other things, a system and methods for detecting and identifying arcing in switched electrical devices. Various features and advantages of the various embodiments disclosed herein are set forth in the following claims. In the foregoing specification, specific examples, features, and aspects have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A circuit interrupting device comprising:

a line terminal;

a current sensor configured to measure a current flowing through the line terminal;

a zero cross detection circuit configured to measure a voltage and a frequency of the line terminal; and a microcontroller including an electronic processor, the microcontroller configured to:

apply a digital filter to a line current measurement signal received from the current sensor, determine a plurality of zero cross positions of a line voltage measurement signal received from the zero cross detection circuit, count a plurality of turning points of the filtered line current measurement signal, determine a position of each turning point of the plurality of turning points relative to a corresponding zero cross position of the plurality of zero cross positions, determine a time between each turning point of the plurality of turning points and a subsequent turning point of the plurality of turning points, determine a local extreme derivative value around each turning point of the plurality of turning points, and determine whether an arc fault is present within the circuit interrupting device based on the plurality of turning points, the position of each turning point relative to the corresponding zero cross position, the time between each turning point and the subsequent turning point, and the local extreme derivative value around each turning point.

2. The circuit interrupting device of claim 1, wherein the microcontroller is configured to:

activate an interrupting device when an arc fault is present.

3. The circuit interrupting device of claim 1, wherein the microcontroller is configured to:

apply one or more thresholds to each of the plurality of turning points, the position of each turning point relative to the corresponding zero cross position, the time between each turning point and the subsequent turning point, and the local extreme derivative value around each turning point; and compare the one or more thresholds to each of the plurality of turning points, the position of each turning point relative to the corresponding zero cross position, the time between each turning point and the subsequent turning point, and the local extreme derivative value around each turning point.

4. The circuit interrupting device of claim 3, wherein the microcontroller is configured to:

determine whether the arc fault is present within the circuit interrupting device based on the comparison.

5. The circuit interrupting device of claim 3, wherein the one or more thresholds are determined by a machine learning model stored in a memory of the microcontroller.

6. The circuit interrupting device of claim 1, wherein the microcontroller is configured to:

develop a machine learning model based on the plurality of turning points, the position of each turning point relative to the corresponding zero cross position, the time between each turning point and the subsequent turning point, and the local extreme derivative value around each turning point; and apply the machine learning model to the circuit interrupting device.

7. The circuit interrupting device of claim 6, wherein the microcontroller is configured to:

determine whether the arc fault is present within the circuit interrupting device based on the machine learning model.

8. The circuit interrupting device of claim 6, wherein the microcontroller is configured to:

calculate a probability of whether the arc fault is present within the circuit interrupting device based on the machine learning model.

9. A method of detecting presence of an arc fault occurring within a circuit including a line terminal, the method comprising:

applying, via a microcontroller including an electronic processor, a digital filter to a line current measurement signal received from a current sensor configured to measure a current flowing through the line terminal;

determining, via the microcontroller, a plurality of zero cross positions of a line voltage measurement signal received from a zero cross detection circuit configured to measure a voltage and a frequency of the line terminal;

counting, via the microcontroller, a plurality of turning points of the filtered line current measurement signal;

determining, via the microcontroller, a position of each turning point of the plurality of turning points relative to a corresponding zero cross position of the plurality of zero cross positions;

determining, via the microcontroller, a time between each turning point of the plurality of turning points and a subsequent turning point of the plurality of turning points;

determining, via the microcontroller, a local extreme derivative value around each turning point of the plurality of turning points; and determining, via the microcontroller, whether an arc fault is present within the circuit based on the plurality of turning points, the position of each turning point relative to the corresponding zero cross position, the time between each turning point and the subsequent turning point, and the local extreme derivative value around each turning point.

10. The method of claim 9, further comprising:

activating, via the microcontroller, an interrupting device when an arc fault is present.

11. The method of claim 9, further comprising:

applying, via the microcontroller, one or more thresholds to each of the plurality of turning points, the position of each turning point relative to the corresponding zero cross position, the time between each turning point and the subsequent turning point, and the local extreme derivative value around each turning point; and comparing, via the microcontroller, the one or more thresholds to each of the plurality of turning points, the position of each turning point relative to the corresponding zero cross position, the time between each turning point and the subsequent turning point, and the local extreme derivative value around each turning point.

12. The method of claim 11, further comprising:

determining, via the microcontroller, whether the arc fault is present within the circuit based on the comparison.

13. The method of claim 11, wherein the one or more thresholds are determined by a machine learning model stored in a memory of the microcontroller.

14. The method of claim 9, further comprising:

developing, via the microcontroller, a machine learning model based on the plurality of turning points, the position of each turning point relative to the corresponding zero cross position, the time between each turning point and the subsequent turning point, and the local extreme derivative value around each turning point; and applying, via the microcontroller, the machine learning model to the circuit.

15. The method of claim 14, further comprising:

determining, via the microcontroller, whether the arc fault is present within the circuit based on the machine learning model.

16. The method of claim 14, further comprising:

calculating, via the microcontroller, a probability of whether the arc fault is present within the circuit based on the machine learning model.

17. A system comprising:

a circuit interrupting device including:

a line terminal;

a current sensor configured to measure a current flowing through the line terminal;

a zero cross detection circuit configured to measure a voltage and a frequency of the line terminal; and a microcontroller including an electronic processor, the microcontroller configured to:

receive a line current measurement signal from the current sensor;

receive a line voltage measurement signal from the zero cross detection circuit;

apply a digital filter to the line current measurement signal;

determine a plurality of zero cross positions of the line voltage measurement signal;

count a plurality of turning points of the filtered line current measurement signal;

determine a position of each turning point of the plurality of turning points relative to a corresponding zero cross position of the plurality of zero cross positions;

determine a time between each turning point of the plurality of turning points and a subsequent turning point of the plurality of turning points;

determine a local extreme derivative value around each turning point of the plurality of turning points; and determine whether an arc fault is present within the circuit interrupting device based on the plurality of turning points, the position of each turning point relative to the corresponding zero cross position, the time between each turning point and the subsequent turning point, and the local extreme derivative value around each turning point.

18. The system of claim 17, wherein the microcontroller is configured to:

activate an interrupting device when an arc fault is present.

19. The system of claim 17, wherein the microcontroller is configured to:

apply one or more thresholds to each of the plurality of turning points, the position of each turning point relative to the corresponding zero cross position, the time between each turning point and the subsequent turning point, and the local extreme derivative value around each turning point;

compare the one or more thresholds to each of the plurality of turning points, the position of each turning point relative to the corresponding zero cross position, the time between each turning point and the subsequent turning point, and the local extreme derivative value around each turning point; and determine whether the arc fault is present within the circuit interrupting device based on the comparison.

20. The system of claim 17, wherein the microcontroller is configured to:

develop a machine learning model based on the plurality of turning points, the position of each turning point relative to the corresponding zero cross position, the time between each turning point and the subsequent turning point, and the local extreme derivative value around each turning point;

apply the machine learning model to the circuit interrupting device; and determine whether the arc fault is present within the circuit interrupting device based on the machine learning model.

* * * * *